United States Patent
Adendorff et al.

(10) Patent No.: US 7,904,302 B2
(45) Date of Patent: Mar. 8, 2011

(54) METHOD AND SYSTEM FOR BUSINESS PROCESS MANAGEMENT

(75) Inventors: Michael Adendorff, Surrey (CA); Tom Fazal, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 970 days.

(21) Appl. No.: 11/799,491

(22) Filed: May 1, 2007

(65) Prior Publication Data
US 2008/0183744 A1 Jul. 31, 2008

(30) Foreign Application Priority Data

Jan. 31, 2007 (CA) ...................................... 2576791

(51) Int. Cl.
*G06Q 10/00* (2006.01)
(52) U.S. Cl. ...................................................... 705/1.1
(58) Field of Classification Search .................... 705/1.1
See application file for complete search history.

(56) References Cited

U.S. PATENT DOCUMENTS

| 6,868,413 B1 | 3/2005 | Grindrod et al. |
| 2002/0147726 A1 | 10/2002 | Yehia et al. |

OTHER PUBLICATIONS

European Search Report for Application No. 07121614.7-7-2221, Dated Mar. 17, 2009.

*Primary Examiner* — Jonathan Ouellette
(74) *Attorney, Agent, or Firm* — Patterson & Sheridan, LLP

(57) ABSTRACT

A process management system comprises a process model, a process engine and a process user interface. The process model stores predefined configurable process metadata components of one or more business management processes. The process engine configures the process metadata components. The process engine also generates user interface contents for a specific management process based on a set of the process metadata components relevant to the specific management process. The process user interface presents the user interface contents for configuration of the process metadata components, and for conducting the specific management process using the generated user interface contents.

14 Claims, 22 Drawing Sheets

| Table 1 | |
|---|---|
| Event Type Name: | e.g. Missing or Invalid Employee Data (1) |
| Process Template Type: | e.g. Approval, Notification (50)<br>Type governs coach layout and business rules |
| Query : | System Query Spec (6)<br>This is a proprietary system query language. The System Query engine generates SQL for retrieving data from the data warehouse. Initially, to speed up development, process event data may be retrieved using a SQL query (1) rather than a System Query.<br><br>Query results are shown within the modelling tool, used in business rules or to create parameterized URLs to external content. |
| Event Key Columns: | One or more query column representing the business key of each unique event within a single dataset (17). By default the entire dataset is considered a single event. Specifying key columns allows a single query result to be split into multiple events.<br><br>Multi-part keys are supported, e.g. Company Code and Employee Id are needed to uniquely identify an employee. |
| Dataset Key Columns: | One or more query column representing the business key of the data set. |
| CDC Columns: | Changed Data Capture (CDC) Columns are columns that indicate the existence of new or changed rows in the data warehouse. These columns do not have to be present in the dataset. They will be added as search arguments to the query. (16). By default CDC is not enabled. |
| Display Columns: | Indicate which of the query columns are displayed within the Data Table of the coach (17). Default is to display All Columns. |
| | Columns have the following additional properties:<br>Display name<br>Data type<br>Format mask<br>Default value (used when data table is writable)<br>Simple picklist (used when data is writable). Several Types:<br>• DomainList – dropdown list with specific values<br>• Date<br>• Time<br>Lookup (used when data is writable). Several types of lookup.<br>• LookupWarehouseObjectReferance(WaehouseObjectName, Hierarchy, LookupStyle)<br>• LookupUser() |

Figure 9A

| | |
|---|---|
| Dataset Update Rule: | No Update (114); DataSet Key Update (6) ; Complete DataSet (114) |
| Dataset Storage Rule: | DataSet Key Only and Required Columns only (144) ; Complete DataSet. If the complete dataset is not stored it is read on the fly (6). See Updating the Dataset for in-flight processes |

Note: In the case where the event owner is derived from the dataset, a change detected to the owner will automatically trigger a transfer of ownership if the Dataset Update Rule is set to "Complete DataSet"

| | |
|---|---|
| Analytics Dimensions: | (83) Dimension Name: Adaptive Warehouse Dimension Name More than one Adaptive Warehouse Dimension may be specified. For each dimension, specify one or more: |
| | Dimension Key: Name of Adaptive Warehouse dimension Dimension Key Reference: Dataset column used in reference. |
| | Example: Dimension Person keyed on Company Id references Dataset Column Company Id second key Employee Id references Dataset Column Employee Id |
| Analytic Gregorian Time Dim: | (83) Time Dimension Name, e.g. Calendar Dataset Gregorian Date Column, e.g. Hire Date Time Grain, e.g. Month |
| Analytic Custom Time Dim: | (83) Time Dimension Name, e.g. Calendar Dataset Year Column, e.g. Fiscal Year Dataset Period Column, e.g. Fiscal Period Dataset Calendar Variant Column, e.g. Fiscal Variant |
| Title[Notification]: | Title of notification message (1). If null generate from Event Type Name. "Cognos 8 Analytic Apps Notification - " & Event Type Name & " (" & $Process Id & ")" |
| Owner Notification: | List of State changes or actions that require notification e.g: Open ; Close or cancel by another user or system ; Approval Rejection ; Approval ; Escalation ; Transfer of ownership ; Comment Created by the system or another user ; Comment edited ; Data Table altered by system or another user; custom action More than one change on the same event at the same time should result in a single notification. Change notifications should indicate what has changed. |

Figure 9B

| | |
|---|---|
| Title[Reminder]: | if null generate(2) |
| Title[Escalation]: | if null generate (3) |
| Title[ Change Notification]: | if null generate (4) |
| Title [Requires Approval]: | if null generate (5) |
| Title [Approval Denied]: | if null generate (5) |
| Message [Notification]: | Title of notification message (1) |
| Message [Reminder]: | if null use default reminder message (2) |
| Message [Escalation]: | if null use default escalation message (3) |
| Message[ Change Notification]: | if null use default change notification (4) |
| Message [Requires Approval]: | if null use default requires approval message (5) |
| Data Table Title: | if null use default data title (1) |
| Note: All Messages and Titles may be text expressions that include query columns, e.g. "Exception: " + EmployeeNumber . (15) | |
| EventOwner: | User or group |
| OwnerListRule: | Round robin; Send to group allow somebody to take ownership |
| Approval Rules: | [None] ; Approve on state change (20) ; Approve on Owner Request (5) |
| Approval Actions: | List of actions that require approval (20) |
| Approval Condition: | Approval condition is always of the form: <Aggregate function> (<Data Set Column Name>) <Comparison Operator> <Value> Aggregate functions: Sum, Min, Max, Count Comparison operators: = ; . . ; < ; <= ; >= e.g. Max($Salary) > 90,000 where $Salary is a column in the input query (20) Approval conditions vary by Action |
| Approver: | Round robin; Send to group allow somebody to take ownership Approver varies by Action |
| Approver List Rule: | Send to All (5); Load Balance (122) |
| Escalate To: | List of users or groups (3) |
| List of users or groups may be set to columns in query result set (25) | |
| (The list of users/groups here correspond to the set of time periods 'Escalate Days' described below) | |

Figure 9C

| | |
|---|---|
| Event Due Date: | Column in input dataset representing the due date for the event (20). Default to current date if no explicit date is specified. |
| Reminder Days: | e.g. -1,0,1,7 Sends a reminder day before due date, on the due date, one day after and 1 week after (20) |
| Reminder Reset: | List of actions that reset the reminder. e.g. Transfer, Change Notification. Resets reminder clock on action. Example: With Reminder Days set to 0,1,7, a reminder would be send 1 day after transfer. A reminder will not be sent on the day of transfer. |
| Reminder Personalizable: | Users can personalize reminder settings (180) Y/N |
| | Note: Personalization setting are by user by event |
| Non-Replication Rule: | No non-replication (1) ; Don't replicate events for in-flight processes (10) ; Don't replicate event ever (10) |
| Auto-close No Exception: | Close any in event that no longer has any exception data. Y/N. (21) |
| Auto-close No Activity: | Specify number of days after which event is to be closed if there is no activity. Default 365. (21) |
| Auto-close Expiry Days: | Specify number of days after which event is to be closed (whether or not there is activity. Default none. (103) |
| Escalate Days: | e.g. 8, 13 Escalates once 8 days past due. Next level escalation after 13 days. (20) |
| Escalation Reset: | e.g. Transfer, Change Notification. Resets escalation clock to date of transfer or date of submission of a change notification so that re-escalation only occurs 8 days after a transfer of ownership. |
| Escalation Reminder Days: | e.g. 1,7 Sends a reminder about an escalation one day after the escalation. Default: no reminders on escalations. (20) |
| Data Update Rule: | No Updates (1), Allow Updates (40), Allow Updates and Inserts (40) |
| Update Columns: | Indicate which of the query columns are editable in the coach. (40) |
| Auto-update Warehouse: | Automatically apply fact or dimension writes to the data warehouse on next load. (75). Y/N. |
| Purge Write Queue: | Y/N. Indicates whether updates may be purged from the write queue upon processing of the write queue. |
| Data Table Display Style: | Form(50) or Grid (1) |
| Embedded Content: | One or more URL with display order, name, description (30), size |
| Links: | One or more URL with group name, display order, name, description (6) |
| URLs may be parameterized, e.g: //somesystem/cgi-bin/syestem.cgi?employe_id=<$EmployeeId> (15) | |

Figure 9D

Embedded Content and Links are either Adpative Analytics reports or URLs. Adaptive Analytics metric type performance reports are identified by [InfoPack Path].[Metric Type]. [Report Pack]. [Hierarchy]. [Analytic Type]. Operational reports are indentified by [Path].[Operational Report Pack]. Prompt values may be specified, e.g. "Employee Id" = $EmployeeId. Implementation sequence for Adaptive Analytics reports (31).

| | |
|---|---|
| Available Actions: | List of supported pre-defined and custom actions<br>Predefined actions:<br>Transfer Ownership (7) , Reject (7) ; Request Approval (5) ; Delegate (8)<br>Custom automated actions – Invoke another Event Management Process(49) or a custom sub-process (100)<br>e.g. Capture Revenue Share Allocation<br>Custom manual actions – Allow user to record manual actions<br>e.g.: Corrected data in ERP (7) |
| Close on Action: | List of actions that will close the process. If there is an approval on the action, the process will only be closed on approval.<br>Default : Reject |
| Reminders Delegated Event: | Suspend Reminders on Originating Event ; Continue Reminders on Originating Event |
| Delegated Event Approval: | No Approval ; To be approved by user performing delegation ; Transfer approval settings from original event to delegated event |
| Escalate Delegated Event: | No Escalation ; Escallate to user performing delegation ; Transfer escalation settings from original event to delegated event |
| Change Notification Delegation: | Continue with change notification on the originating event ; suspend change notification until all delegated tasks are complete ; Perform change notification on originating event each time a delegated task is completed |
| Analytics Count Actions: | Occurrences of actions to be counted. Default None. |
| Analytics Time Actions: | Timing of actions to be counted. Default None. |
| Process Extension: | Process extensions are TeamWorks processes may be run from any event management process. Process extensions are run before, after or instead of any of the pre-defined activities. They may also be triggered by a Custom Action in the UI or through a change in the State variable for the process, e.g. Run CustomUploadTOPeopleSoft after DataCapture activity. (100) or trigger the execution of "Missing or Invalid Employee Data event". (49) |

Figure 9E

| | |
|---|---|
| Batch Notification Delay Hours: | Maximum permissible delay for batching of event notification. E.g. delay for up to 12 hours to include in a nightly request. Default 0. (124) |
| Batch Change Delay Hours: | Maximum permissible delay for batching of event change notification. E.g. delay for up to 12 hours to include in a approvals request. Default 0. (124) |
| Batch Reminder Delay Hours: | Maximum permissible delay for batching of reminders. E.g. delay for up to 12 hours to include in a nightly request. Default 0. (124) |
| Batch Approval Delay Hours: | Maximum permissible delay for batching of approvals. E.g. delay for up to 12 hours to include in a nightly approvals request. Default 0. (124) |
| Batch Escalation Delay Hours: | Maximum permissible delay for batching of escalations. E.g. delay for up to 12 hours to include in a nightly request. Default 0. (124) |
| Schedule Type: | Run manually (1)<br>Run after execution of dataflow (28)<br>Run Interval is minutes (123)<br>Run Interval is hours (123)<br>Run Interval is days (123)<br>Run Interval is weeks (123)<br>Run Interval is months (123)<br>Run Interval is years (123) |
| Events may also be triggered by an action on another process. | |
| Schedule Interval: | e.g. 30 minutes |

METHOD AND SYSTEM FOR BUSINESS PROCESS MANAGEMENT

CROSS-REFERENCE TO RELATED APPLICATIONS

This application claims the benefit of Canadian Patent Application No. 2,576,791, filed Jan. 31, 2007. The disclosure of the above application is incorporated herein by reference.

FIELD

The present disclosure relates to a method and system for business process management, especially relates to a method and system for modeling business management processes and automating management of business management processes.

BACKGROUND

The statements in this section merely provide background information related to the present disclosure and may not constitute prior art.

Organizations use business intelligence (BI) as part of a business process. A business process is a set of linked activities that create value by transforming an input information into an output information that is more valuable to the organization. In most organizations this process is very informal. It is not documented and it is performed manually. Although it is possible to document and provide automation aids for the use of business intelligence within a process, it is not cost effective to do this using current technology.

Business processes are typically categorized into operational processes and management processes. Operational processes create the primary value stream of the business of the organization. Typical operational processes relate to transaction activities, such as purchasing, manufacturing, marketing, and sales. Management processes are the processes that govern the operation of the organization, such as corporate governance and strategic management.

Operational processes are often automated using a custom developed applications or pre-packaged enterprise applications. Custom developed applications are created using a general purpose programming language or special purpose Business Process Management software.

Some management processes have been automated in the same way, but these methods are not well suited to the automation of management processes. Management processes tend to be more volatile than operational processes. These processes often involve exception management. Although it is a lot faster to automate processes using special purpose Business Process Management software than using a traditional programming language, it still takes too long to automate processes and once implemented, the automated processes take too long to change.

It is therefore desirable to provide a mechanism that can provide efficient management for business management processes that can be easily changed.

SUMMARY

It is an object of the invention to provide an improved method and system for business process management that obviates or mitigates at least one of the disadvantages of existing systems.

The invention uses a process model that contains predefined configurable process components.

In accordance with an aspect of the present invention, there is provided a process management system comprising a process model, a process engine and a process user interface. The process model is provided for storing predefined process metadata components of one or more business management processes, the process metadata components having configurability. The process engine is provided for configuring the process metadata components, and for generating user interface contents for a specific management process based on a set of the process metadata components relevant to the specific management process. The process user interface is provided for presenting the user interface contents for configuration of the process metadata components, and for conducting the specific management process using the generated user interface contents.

In accordance with another aspect of the invention, there is provided a method of automating a management process. The method comprises the steps of providing a process model storing predefined process metadata components of one or more business management processes, configuring a set of the process metadata components for processing a specific management process, detecting the specific management process, reading the set of the process metadata components, generating user interface contents for the specific management process based on the set of the process metadata components, and presenting the user interface contents for a user action for conducting the specific management process.

In accordance with another aspect of the invention, there is provided a computer readable medium storing instructions or statements for use in the execution in a computer of a method of automating a management process. The method comprises the steps of providing a process model storing predefined process metadata components of one or more business management processes, configuring a set of the process metadata components for processing a specific management process, detecting the specific management process, reading the set of the process metadata components, generating user interface contents for the specific management process based on the set of the process metadata components, and presenting the user interface contents for a user action for conducting the specific management process.

This summary of the invention does not necessarily describe all features of the invention.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

These and other features of the invention will become more apparent from the following description in which reference is made to the appended drawings wherein:

FIGS. 9A to 9F shows table 1 listing an example of process metadata items;

Figure 18:
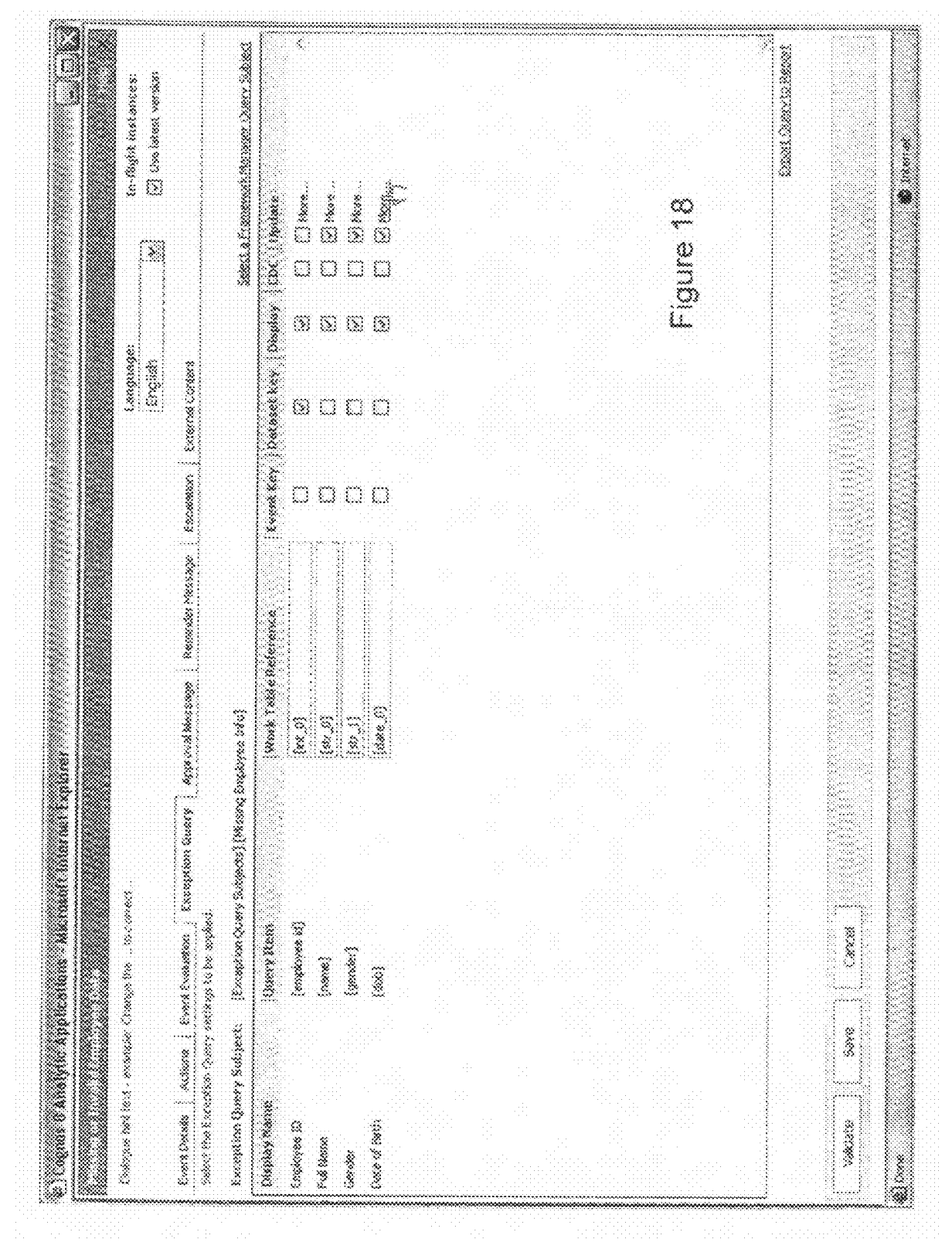

FIG. 18 is a screen shot showing another example of the process user interface screen;

DETAILED DESCRIPTION

The following description is merely exemplary in nature and is not intended to limit the present disclosure, application, or uses.

Figure 1:
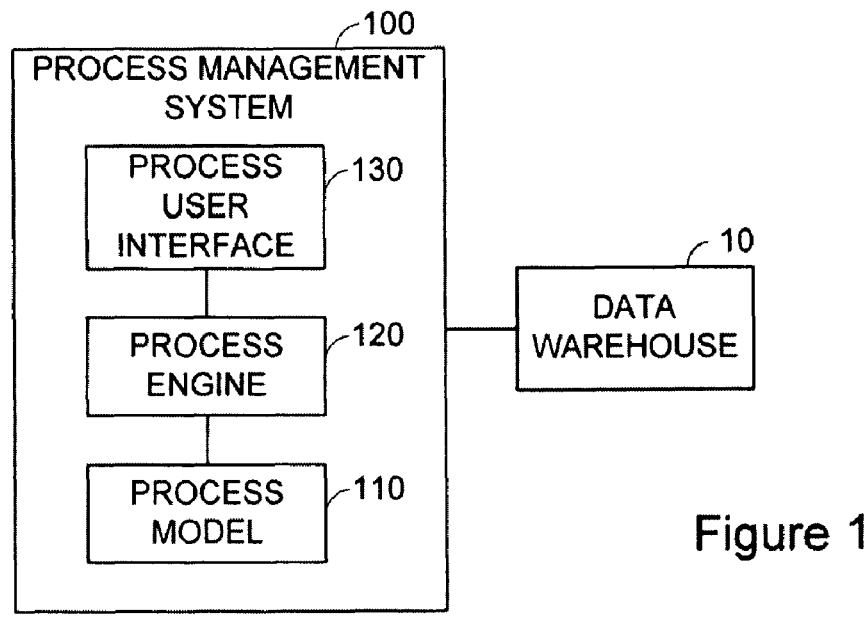
FIG. 1 is a block diagram showing a process management system in accordance with an embodiment of the present invention.

FIG. 1 shows a process management system 100 in accordance with an embodiment of the invention. The process management system 100 is used in a computer system to manage business management processes. The process management system 100 is suitably used to manage organization's management processes using data in a data warehouse 10 of the organization. In a different embodiment, the process management system 100 may use data in a different data source.

The process management system 100 is used to describe and automate management processes that are needed to manage events involving exceptions or other events. The process management system 100 provides a set of capabilities that allows the development of pre-packaged management processes. It includes a configuration environment that makes it possible to quickly reconfigure pre-packaged management processes to fit each organization's unique requirements. The process management system 100 provides a new approach for modeling and automating management processes.

As shown in FIG. 1, the process management system 100 has a process model 110, a process engine 120 and a process user interface (UI) 130.

The process model 110 stores predefined management process components or process metadata. Process components have a high degree of configurability. Process components are expressed by simple declarative specification of processes. The declarative specification of processes is used as a set of reconfigurable process building blocks. Thus, each organization can rapidly alter the configuration of these management processes so that they support highly volatile management processes of the organization. Also, organizations can extend the predefined management processes in the process model 110 and create new management processes rapidly from a set of high level process building blocks.

Also, since the process metadata is described in declarative specification, the process management system 100 supports upgrade of the process model 110 including pre-packaged process definition and process building blocks while preserving organization's extensions and configurations settings.

For example, the process model 110 may contain predefined process metadata describing an event detecting and management process. The event detecting and management process may include process metadata representing process building blocks or components that describe an event detecting process, a notification process, a user action handling process, a reminder process, and an escalation process.

The process metadata may be a set of extensible markup language (XML) files.

The process engine 120 interprets the declarative specification of management processes in the process model 110, and produces user interface contents for users to conduct management processes.

Figure 2:
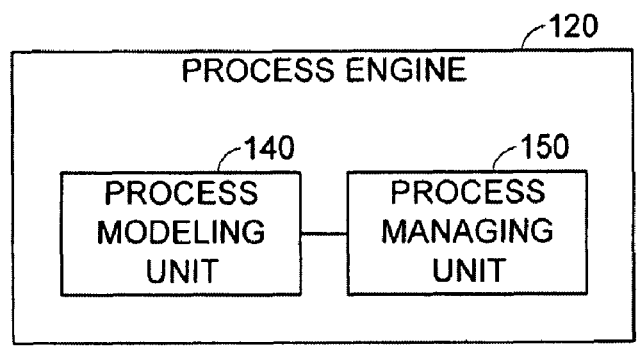
FIG. 2 is a block diagram showing an embodiment of a process engine.

FIG. 2 shows an embodiment of the process engine 120. The process engine has a process modeling unit 140 and a process managing unit 150.

Figure 3:
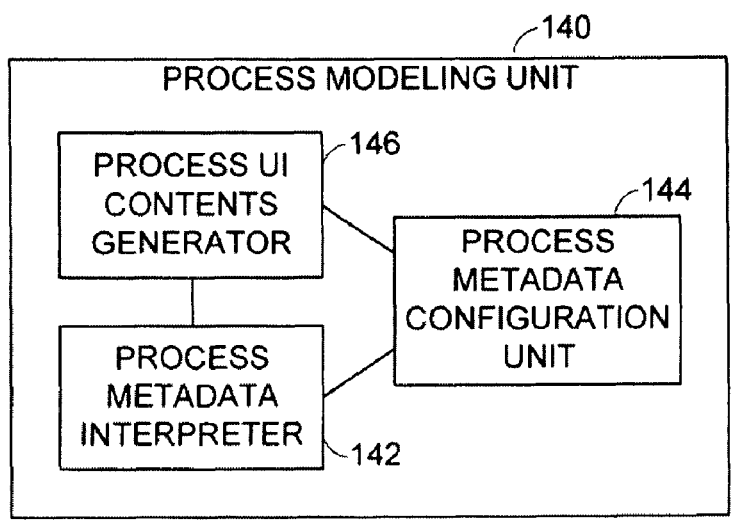
FIG. 3 is a block diagram showing an embodiment of a process modeling unit.

The process modeling unit 140 manages the management process modeling by an administrator of the process management system 100. FIG. 3 shows an embodiment of the process modeling unit 140. In this embodiment, the process modeling unit 140 has a process metadata interpreter 142, a process metadata configuration unit 144, and a process UI contents generator 146.

The process metadata interpreter 142 reads and interprets process metadata, i.e., the declarative specification of processes, in the process model 110.

The process metadata configuration unit 144 configures process metadata in the process model 110 and defines new process metadata. For example, the process metadata configuration unit 142 allows the administrator to set the value of an owner of an event and insert text of notification messages. The process metadata configuration unit 144 writes the configured process metadata and the new process metadata in the process model 110.

The process UI contents generator 146 generates UI contents based on the interpretation of the process metadata for presenting the generated UI contents to users through the process UI 130. UI contents often include configuration options and metadata items for which the administrator can set the values. The process configuration unit 144 configures existing process metadata and defines new process metadata based on user's selections of the configuration options and value settings.

The process managing unit 150 manages business management processes in run time based on the process model 110.

Figure 4:
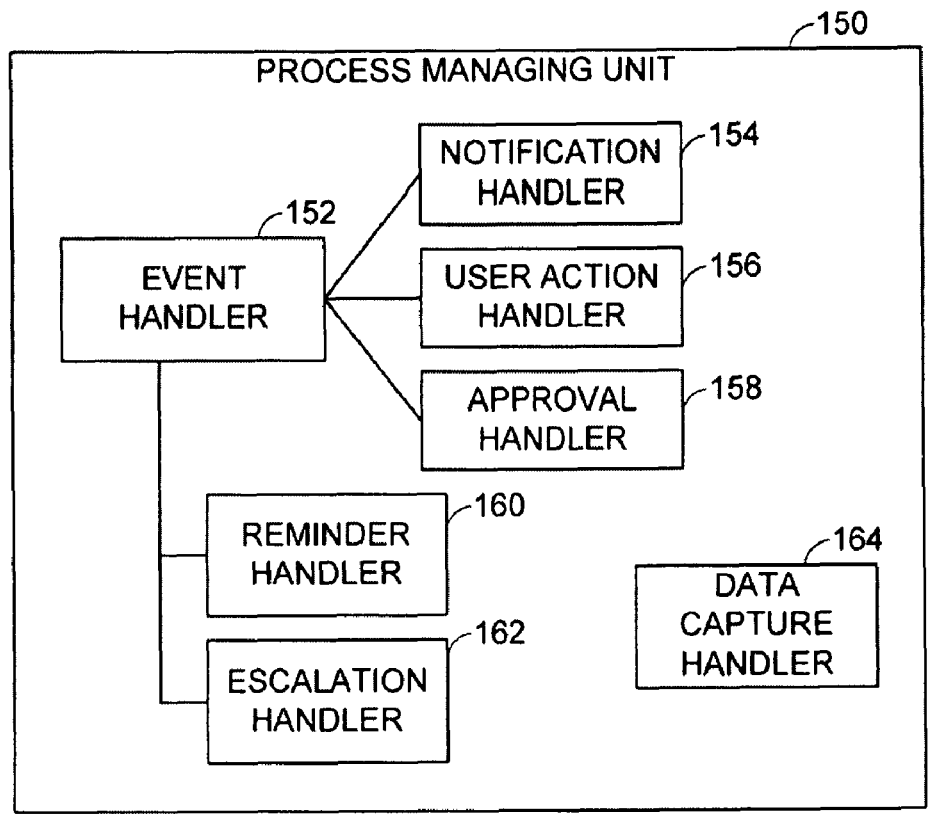
FIG. 4 is a block diagram showing an embodiment of a process managing unit.

FIG. 4 shows an embodiment of the process managing unit 150. In this embodiment, the process managing unit 150 has an event handler 152, a notification handler 154, a user action handler 156, an approval handler 158, a reminder handler 160, an escalation handler 162 and a data capture handler 164.

The event handler 152 handles detection of events. For example, when data is read from the data warehouse 10, exceptions may be found. The event handler 152 determines an event for one or more exceptions that is managed by one of the management processes described by the process metadata stored in the process model 110. The process metadata of the management process for the event describes, for example, the owner of the event, relevant notifications and the manner of sending the notifications, and other relevant processes.

The notification handler 154 handles notifications. For example, when a specific event is detected, the process metadata interpreter 142 reads the process metadata for managing the specific event, and determines the owner of the event based on the process metadata and invokes the notification handler 154. The notification handler 154 sends a notification to the owner in accordance with the method described in the process metadata for the event.

The user action handler 156 handles actions taken by the owner. For example, if the owner of the event changes the data based on the notification, the user action handler 156 effects the correction in the data warehouse 10.

The approval handler 158 handles an approval process. For example, when the owner of the event makes changes to the data, the approval handler 158, based on the process metadata for the event, determines if an approval of the changes is needed, and if an approval is needed it further determines who is an approver, sends an approval request to the approver, and receives a response from the approver. Depending on the response of the approver, the approval handler 158 processes the changes or returns the response to the owner for further modification.

The reminder handler 160 sends reminders based on relevant process metadata. Process metadata describes to whom reminders are to be sent, how the reminders are to be sent, and what text the reminders should include. For example, process metadata for an event describes to send a reminder to the owner of the event in 7 days from the initial notification if the owner does not take appropriate actions. The manner of sending reminders and text of the reminders may be set by the administrator.

The escalation handler 162 escalates an event based on relevant process metadata. Process metadata describes to whom the event is to be escalated, how it is to be escalated, and what text the escalation notification should include. For example, process metadata for an event describes to escalate to a supervisor of the owner of the event in 20 days from the initial notification to the owner if the owner does not take appropriate actions. The manner of escalation may be set by the administrator.

The data capture handler 164 captures data from end users of the application based on process metadata. Data is captured by users and part of the process. This data is used for subsequent steps of the process, or by other processes or merely for auditability.

The process user interface 130 presents the user interface contents to users, and receives users' input for setting the system configuration during the modeling time, and for conducting processes during run time.

Figure 5:
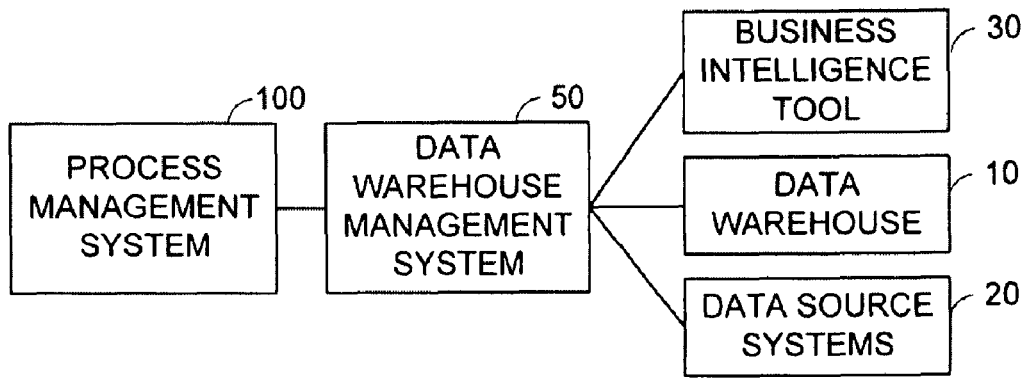
FIG. 5 is a block diagram showing a process management system in accordance with another embodiment of the invention.

As shown in FIG. 5, the process management system 100 may work with or be incorporated with a data warehouse management system 50. The data warehouse management system 50 is used for construction, maintenance and use of the data warehouse 10 for an organization. The data warehouse management system 50 builds the data warehouse 10 from one or more data source systems 20, such as enterprise resource planning (ERP) systems, and delivers information of data in the data warehouse 10 to one or more business intelligence tools 30, which presents to users the delivered information as reports.

The data warehouse management system 50 may be a data warehouse solution system described in co-pending U.S. patent application Ser. No. 11/480,009, which is hereby incorporated by reference.

Figure 6:
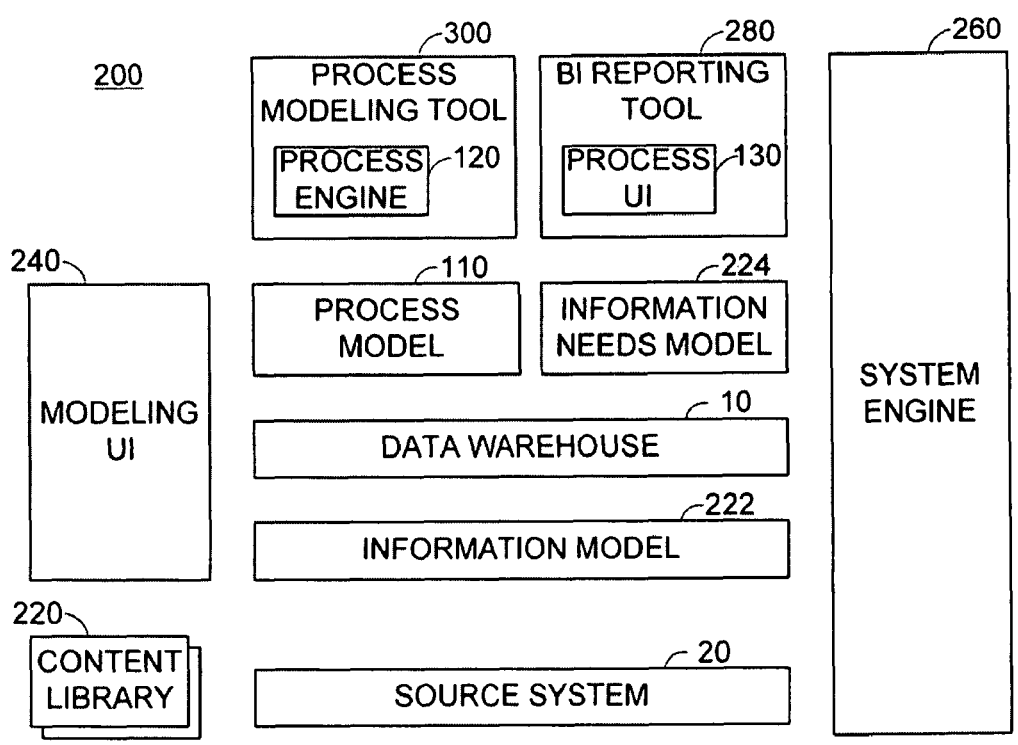
FIG. 6 is a diagram showing an embodiment of the process management system.

FIG. 6 shows a process enabled system or process management system 200 which incorporates the process management system 100 and the data warehouse management system 50. The process management system 200 manages business processes including management processes and operational processes. The process management system 200 has a content library 220, a modeling user interface 240 and a system engine 260.

The content library 220 is a predefined set of metadata describing a packaged data warehouse and set of role-based reports. The content library 220 may be a set of XML files. The content library 220 is instantiated into the user's environment as a relationally stored information model 222 and information needs model 224. The data information model 222 describes data that is available for building reports and satisfies the information needs indicated in the information needs model 224, such as star schema models of the data warehouse 10, mapping of source systems 20 to the star schema models, and data transformation rules. The information needs model 224 includes descriptions of metadata regarding information needs for building reports by users, such as metadata about user roles, measures important to the roles, members of the roles, context filters that apply to the members, display styles and templates, and dimensions used for building reports.

The content library 220 also includes predefined process metadata expressed in XML form. The relational metadata store of the content library 220 includes the process metadata, which is instantiated into the user's environment as a process model 110.

The modeling UI 240 allows viewing and reconfiguration of predefined content as well as authoring of new content in the content library 220.

The system engine 260 generates runtime data warehouse 10 and report artifacts from metadata in the information model 222. The system engine 260 is also the runtime data management engine. It generates and runs the extract-transform-load (ETL) code that is used to load the data warehouse 10. The system engine 260 includes functionalities of the process engine 120.

The process management system 200 also has a BI reporting tool 280 as a runtime environment for the system user interface. The BI reporting tool 280 receives user's requests for data, transforms the requests into system queries in a system language to apply to the data warehouse 10, receives query results from the data warehouse 10 and generates reports using the information needs model 224.

The process management system 200 also has a business process modeling tool 300 as a modeling environment to cover process configuration and authoring new processes. The process modeling tool 300 provides a modeling user interface and data writing functionality. The process modeling tool 300 also provides database tables which store the process metadata and data relating to inflight processes. These database tables are included in the same database instance as the data warehouse 10 and other metadata tables of the process model 110 as well as the information model 222 and the information needs model 224.

The process modeling tool 300 may be an existing modeling tool that provides functionalities of modeling user interface and modeling configuration. An example of such a modeling tool is TeamWorks of Lombardi Software, Inc.

The process modeling tool 300 may be integrated with the BI reporting tool 280 to support various functions, such as single sign-on, embedded BI content and report links in the process modeling tool 300, launching the process modeling tool 300 from BI reports, triggering the process modeling tool 300 by events in the BI reporting tool 280, and the process modeling tool 300 getting data using the specification of the BI reporting tool 280.

The system engine 260 manages metadata delivery to the process modeling tool 300 from the process model 110. Unlike runtime data warehouse objects and reports, it is typically unnecessary to generate processes for the process modeling tool 300 from metadata. The system engine 260 creates in the process modeling tool 300 a single high level master event management process that is dynamic enough to take on different forms based on different configuration metadata.

The BI reporting tool 280 provides data warehousing and reporting capabilities. The data warehouse management system extracts data from source systems 20 and writes it to the data warehouse 10. Processes use data from the data warehouse 10. Processes also update existing warehouse data and add new data to the warehouse. The business intelligence tool 280 creates reports on this data.

The process management system 100, 200 manages business management processes. A typical business management process has three high level processes: initiate and monitor exceptions, reminders and escalation.

Figure 7:
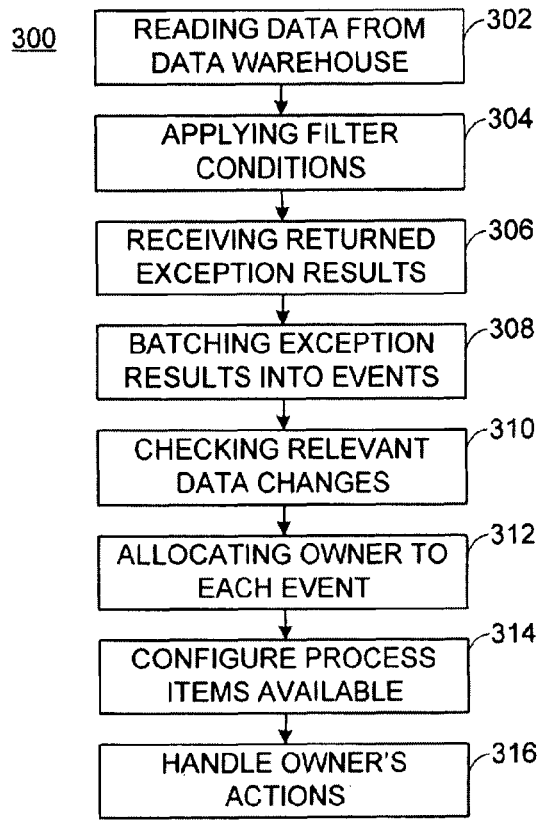
FIG. 7 is a flowchart showing an example of a process management.

FIG. 7 shows an example of a process 300 of initiating and monitoring exceptions. Data is read from a data warehouse in response to a query (302). Filter conditions are applied to the query (304) so that only data that meets predefined exception criteria is returned (306). Exception results are batched into one or more events (308). In-flight processes, such as reminders, escalations, and reconciliation, are checked for relevant data changes (310). An owner is allocated to resolve each event (312). The title of the event notification, message, business rules and actions available to resolve each event are configurable (314). The owner takes one or more actions (316), such as capturing annotations or making a record of actions manual actions performed in response to the event, lunching one or more URLs to BI Reports, updating data, transferring ownership, and approval.

The reminders process sends reminders for events that are not acted on within a pre-defined time period.

The escalation process escalates events that are not closed within a pre-defined time limit to one or more other participants.

Figure 8:
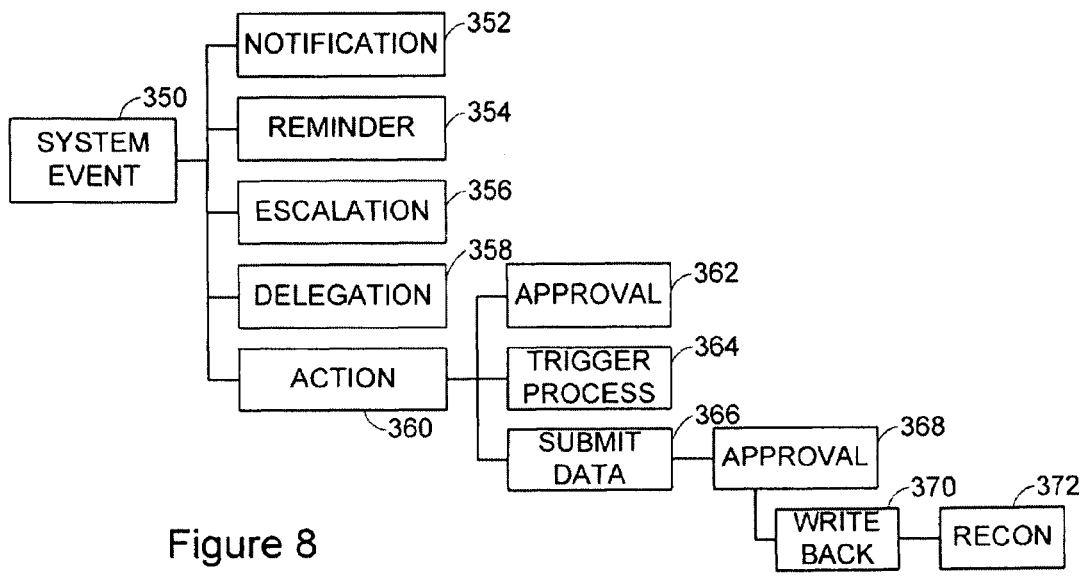
FIG. 8 is a diagram showing a system event.

In view of the typical business process shown in FIG. 7, the process management system 100, 200 describes a system event 350 in multiple process building blocks or components, for example, as shown in FIG. 8, including processes components of notification 352, reminder 354, escalation 356, delegation 358, and action 360. The action process component 360 is further described by process components of approval 362, trigger process 364 and submit data 366. The submit data process component 366 includes process components of an approval 368, a write back 370 and a reconciliation 372.

The process management system 100, 200 manages these business processes by using relevant process components or metadata in the process model 110. The event detection and management process is further described using the process management system 200 hereinafter.

Table 1 shown in FIGS. 9A to 9F is an example list of process metadata stored in the process model 110. This process metadata is used to describe a process for event detection and management. The metadata comprises a simple declarative specification of the process. Default values for each metadata item are shown in bold. The numbers in brackets in the list in Table 1 indicate implementation sequence. In this example, Event Type Name, Process template Type, Query, Dataset key Columns, Message [Notification], and Event Owner are mandatory components, and the others are optional components.

By defining and configuring a predefined process by means of metadata which is a simple declarative specification of the process, users can easily reconfigure the process and create new process based on the predefined process metadata. It is not necessary for users to modify processes in programming source code, which takes a long time, as in existing systems. Also, in such existing systems, once a user has modified the source code, it is not possible for the vendor to upgrade the process definition without over-writing the user's modifications. In the process management system 100, 200, user's configuration settings are preserved by way of the declarative specification when the system is upgraded by the vendor, and thus, it is not necessary for users to redo modifications that they made in the previous version of the system.

While Table 1 shows an example set of metadata items for an event detection and management process, a different example may be defined by a different set of metadata items. Also, a different process may be defined by a different set of metadata items. The process model 110 may contain metadata describing multiple business processes.

The process management system 200 may allow participants in an event to have access to data shown in a data table with the user interface. In that case, each individual notification may not be validated for data security. When the process allows data writes, the process management system 200 allows any process participant to write data. In a different embodiment, the process management system 200 may limit access to certain data to certain participants.

The process management system 200 may support the upload of document attachments when capturing annotations and actions.

If the BI query specification that is used to retrieve the dataset does not contain sufficient metadata to perform a write of dimension or fact data to the warehouse, the metadata model 110 is extended to allow automatic update of the data warehouse 10. These extensions are modeled as part of the process model 110 and captured by the process modeler. The extensions include information such as: allowed domains of values for fields and default values used when inserting data.

Some items of process metadata are not known at design or modeling time of the process management system 200. The process management system 200 infers those items at runtime from data contained within the dataset retrieved by a query defined in the process metadata. For example, the process management system 200 may build titles and messages from columns in the dataset. Other examples of such process metadata that are to be inferred include owner, approver and escalate-to, event due date, and URLs for links and embedded content.

The key of the dataset may be lower grained than the key of the event. This means that a situation may arise where the column values are ambiguous. An example is shown in Table 2.

TABLE 2

| Event Key | Data Set Key | Owner |
| --- | --- | --- |
| A | A1 | Jim |
| A | A2 | Fred |

TABLE 2-continued

| Event Key | Data Set Key | Owner |
|---|---|---|
| A | A3 | <null> |
| B | B1 | Mary |

In this example dataset, the owner for event A is ambiguous. It may either be Jim, Fred or null. In order to select a single owner for the event, the system 200 may select the last non-null value, e.g., in this example, it is "Fred".

The process management system 100, 200 provides metadata describing data writes. The process management system 100, 200 writes to a write queue within the data warehouse data that is captured by means of an edit to the data table. A post-edit process reads the write queue, processes the contents and then optionally removes processed entries from the write queue. If the data represents data warehouse dimension items or atomic level facts, the process management system 100, 200 provides an option available to automatically read from the staging area and load into the data warehouse. The process management system 100, 200 generates a special warehouse dataflow for this purpose. This dataflow is a "system" dataflow. It is visible in load management but not in the data warehouse design environment. When automatically loading the data warehouse from the write queue, it is necessary to leave the processed entries in the write queue for re-processing. For example, data is loaded from a source ERP system. This data is inaccurate. It is corrected by means of a management process by the process management system 100, 200. Each reload potentially replaces corrected data with incorrect data from the source system. This means that the process management system 100, 200 re-applies corrections after each load. Not all data captured into data tables is automatically written to the data warehouse. The process management system 100, 200 determines data that is to be automatically written depending on configuration options in the metadata. In most cases the data is loaded into another system using a custom written process written in the process modeling tool or other technology. Another system is some or other external database, e.g. database used by an ERP system. Data is manually extracted from the process tables and loaded into the external system.

The process model 110 may provide process metadata describing closing in-flight processes. Processes remain in-flight until they are closed. The process metadata describes the conditions for closing processes by the process metadata. The process metadata may provide options to close in-flight. The options include that exception conditions no longer found in data (auto-close no exception), after a period of inactivity (auto-close no activity), at a predetermined expiry date (auto-close expiry days), and user actions may close events (close on action).

The process model 110 may provide process metadata describing updating the dataset for in-flight processes. While processes are in-flight, the associated dataset may or may not have to be refreshed. This is behaviour that is determined by the "Dataset Update Rule" and the "Dataset Storage Rule" in the process metadata. The process management system 100, 200 may store only the key of the dataset along with in-flight data. Other data columns may be read on the fly from the data warehouse. The process metadata may provide an option to store the entire dataset with along with other in-flight data.

Data warehouse data is typically updated on a nightly basis. Data changes may impact in-flight processes. The Dataset Update rule determines this behaviour. The rule may include: No update, Dataset key update, and Complete dataset. No update creates a dataset when event is created. When this option is selected, the process management system 100, 200 never updates dataset. Dataset key update creates a dataset when event is created. When this option is selected, the process management system 100, 200 monitors warehouse data to detect dataset changes for the event key, removes dataset rows that no longer meet exception criteria, and adds new rows that meet exception criteria for event key. Complete dataset refreshes the entire dataset with each update. When this option is selected, the process management system 100, 200 removes rows that no longer meet the exception criteria, adds new rows, and updates existing rows.

The process model 110 may provide process metadata describing non-replication. The data warehouse typically is polled on a daily basis. Each time this polling takes place, a query is fired off to detect new events. The process management system 100, 200 identifies events by an event key that is present in the dataset. It is common that many event management processes are long running. It is likely that sequential executions of a query return the same event key. The Non-Replication rule determines behaviour when encountering an event key that has been previously returned. "No non-replication" creates a new event with the same event key. "Do not replicate events for in-flight processes" ignores event keys if the same key exists for an in-flight process of the same type. "Do not replicate the event ever" never creates a new event with an event key that has been used in a prior event (either in-flight or closed).

The process model 110 may provide process metadata describing changed data capture (CDC). It is common that the queries that poll for events read fact tables containing tens of millions of rows. It is inefficient to re-read unchanged rows of data each time the system queries the data warehouse. The metadata specification makes allowance for the existence of one or more "CDC Columns". When formulating a query, it is necessary to rewrite the query to include filters on the values of these CDC Columns. CDC columns are datetime columns. The value of the CDC filter is set based on the last execution of the query. The value of the CDC filter is set to " . . . AND<CDC Column>>$LastExecutionDate". CDC conditions are OR'ed together, e.g. " . . . AND ((<CDC Column1>>$LastExecutionDate) OR (<CDC Column2>>$LastExecutionDate)). Execution Dates are derived from the data warehouse server and not the process server.

The process model 110 may provide process metadata describing changes to process that impacts on in-flight processes. Wherever possible, the system applies changes in process metadata immediately to in-flight processes. In some cases special business rules may be needed. For example, for Close on Action metadata, when adding a new "Close on Action", the system closes any open in-flight processes that have had the new action take place. There is no need to re-open any close processes on removal. For Reminder Days metadata and Escalate Days metadata, after changing reminder days from, e.g., 30 to 7, the system sends reminders for anything now requiring a reminder. For Owner; Escalate To; Approver metadata, the system transfers activity to another user. For auto-close settings, the system closes the process.

There are classes of change that cannot be applied to in-flight processes, e.g., a change to Dataset Key Columns; Event Key Columns; Change to a query where query results are stored as part of the process data and not refreshed. These changes are only take effect for new process instances.

The process model 110 may provide process metadata describing delegations. "Delegate" is one of the pre-defined actions available for events. If the "Delegate" action is enabled as part of the event type specification, it means that the owner can carve off parts of the event for resolution by another user. The owner carves off parts of the event by selecting one or more rows of the data-set and then selecting a user to delegate. For the most part, a delegated event is a clone of the original event with fewer rows of data in the dataset. The process metadata provides metadata settings that determine how property values are set for the clone as follows:

| | |
|---|---|
| Owner | Owner of child process is set by the owner of the parent process using a modeling UI. |
| Reminders Delegated Event | Suspend Reminders on Originating Event—Clone reminder settings. While one or more delegated event is open, suspend reminders on the parent task. |
| | Continue Reminders on Originating Event—Continue to remind parent.owner that event is open. |
| Delegated Event Approval | No Approval—Delegated task does not have approval even is parent task does |
| | To be approved by user performing delegation—Approval of child action/status change to be performed by parent.owner and not parent.approver. |
| | Transfer approval settings from original event to delegated event—Copy all approval settings from parent to child. Approval of child events to be done out by parent.approver. |
| Escalate Delegated Event | No Escalation—Never escalate the child event |
| | Escalate to user performing delegation—Child.Escalate To = Parent.Owner |
| | Transfer escalation settings from original event to delegated event - Child. Escalate To = Parent. Escalate To |
| Change Notification Delegation | Continue with change notification on the originating event |
| | Suspend change notification until all delegated tasks are complete |
| | Perform change notification on originating event each time a delegated task is completed |

The process model 110 may provide process metadata describing process analytics. The process management system 100, 200 automatically tracks the following measures: Event Count, Time to Close, Time to First Action, Approval Count, Escalation Count, and Reminder Count. The system 100, 200 may optionally track the following measures: <Action> Count, in which actions to be tracked are listed in the metadata under "Analytics Count Actions", and Time to first <Action>, in which actions to be tracked are listed in the metadata under "Analytics Time Actions". The system 100, 200 automatically tracks the following dimensions: Open date, Close date, Status, Owner User, Approval User, Escalate To User, Action Path, and Time Buckets for "Time to Close" and "Time to First Action". The system 100, 200 may optionally track the other dimensions listed in the metadata under "Analytics Dimensions", "Analytic Gregorian Time Dim", and "Analytic Custom Time Dim".

The operation of the process management system 100, 200 is further described for examples.

In the first example, an organization has a business rule that states that all employee records within the Employee Dimension in a data warehouse should contain a valid gender and date of birth. This business rule is not enforced by the human resource source system from which employee data is loaded into the data warehouse. This means that data can be loaded into the data warehouse with unknown gender and date of birth. An exception management process of the process management system 100 is used to ensure that this invalid data is corrected.

The administrator of the process management system 100 configures the exception management process in the process model 110 as follows:

| | |
|---|---|
| Event Type Name: | Missing or Invalid Employee Data |
| Query: | select employee_id, full_name, date_of_birth, gender |
| | from PERSON |
| | where (date_of_birth is null or gender is null or date_of_birth <'1910-01-01') |
| | order by employee_id |
| Display Columns: | Employee Id, Full Name, Date of Birth, Gender |
| Message [Notification]: | "Upon a recent load of the data warehouse, Employees with missing or invalid data were detected. Your urgent attention is required to correct this data. Please make amendments within the human resource source system." |
| EventOwner: | Joan Stevens |
| EscallateTo: | Mary Bean |
| Reminder Days: | 7 |
| Escalate Days: | 14 |
| Non Replication Rule: | Do not replicate events for in-flight processes |
| Actions: | Custom actions: Corrected data in the human resource source system |
| Schedule Type: | Run after execution of dataflow "Person". |

Once the data has been loaded into the data warehouse 10 from the human resource source system, the process management system 100 evaluates the data for exceptions. A query to evaluate the data and the located exception data are as follows:

| SQL Statement |
| --- |
| select employee_id, full_name, date_of_birth, gender from PERSON where (date_of_birth is null or gender is null or date_of_birth < '1910-01-01') order by employee_id |

| Exception Data | | | |
| --- | --- | --- | --- |
| 1 | Emp1 | 1905-06-06 17:56:42.000 | M |
| 2 | Emp2 | 1975-01-05 16:12:09.000 | |
| 3 | Emp3 | | M |
| 4 | Emp4 | | |

In this particular example, these four employee data exceptions are managed by means of a single event of the process management system 100. During configuration, the process management system 100 identifies the event and allocates the owner as per the above configuration, in which the owner of events of this type was predefined as a single user, Joan Stephens.

The process management system 100 sends an event notification by email to Joan Stephens who reviews the notification. An example of the contents of the message is as follows:

| Title: Event Notification—Employees with missing or invalid data (2562) Message: Upon a recent load of the data warehouse, Employees with missing or invalid data were detected. Your urgent attention is required to correct this data. Please make amendments within the human resource source system. Employees with missing or invalid data | | | | |
| --- | --- | --- | --- | --- |
| 1 | Emp1 | 1905-06-06 | M | Original Notification: 2006/04/27 4:00 am |
| 2 | Emp2 | 1975-01-05 | | Original Notification: 2006/04/27 4:00 am |
| 3 | Emp3 | | M | Original Notification: 2006/04/27 4:00 am |
| 4 | Emp4 | | | Original Notification: 2006/04/27 4:00 am |

Joan makes changes in the human resource source system. She changes employee 2, 3 and 4. She missed the invalid birth date of employee 1. She takes an action on the event to set the status of the event to "Updated Source Data". She captures a comment against the event indicating that "Employees had been loaded from an external data feed into the human resource source system incorrectly".

The process management system 100 reload the data warehouse automatically overnight, and re-evaluate the event data. This time there are two queries. The first query checks to see whether the data that has already been flagged as part of the event still meets the exception criteria. The next query checks to see whether there is any other data in the Person table that satisfies the exception criteria SQL Statement 1—Check existing events
select employee_id, full_name, date_of_birth, gender
from PERSON
where (date_of_birth is null or gender is null or date_of_birth < '1910-01-01') and employee_id in (1,2,3,4)
order by employee_id Results returned
1   Emp1   1905-06-06 17:56:42.000   M
Query 2—Check all data
select employee_id, full_name, date_of_birth, gender
from PERSON
where (date_of_birth is null or gender is null or date_of_birth < '1910-01-01') order by employee_id

| 1.0 | Emp1 | 1975-06-06 17:56:42.000 | M | Original Notification: 2006/04/27 4:00 am |
| --- | --- | --- | --- | --- |
| 5.0 | Emp5 | 1969-02-18 06:33:28.000 | | Original Notification: 2006/04/28 5:00 am |

The process management system 100 sends an event change notification to Joan Stephens for reviewing the updated event. An example of the contents of the message is as follows:

| Title: Event Change Notification—Employees with missing or invalid data (2562) Message: The data corresponding with Event 2562 has changed. Employees with missing or invalid data | | | | | |
| --- | --- | --- | --- | --- | --- |
| 1.0 | X | Emp1 | 1975-06-06 17:56:42.000 | M | Original Notification Date: 2006/04/27 4:00 am |
| 2.0 | ✓ | Emp2 | 1975-01-05 16:12:09.000 | M | Original Notification: 2006/04/27 4:00 am |
| 3.0 | ✓ | Emp3 | 1973-03-01 18:34:28.000 | M | Original Notification: 2006/04/27 4:00 am |
| 4.0 | ✓ | Emp4 | 1974-06-24 02:13:17.000 | F | Original Notification: 2006/04/27 4:00 am |
| 5.0 | X | Emp5 | 1969-02-18 06:33:28.000 | | Original Notification: 2006/04/28 5:00 am |

After each warehouse load, the process management system 100 re-evaluates the event. Existing event data is checked for changes in status. All employee data is checked for exceptions. If there is no change to the exception status of existing event items and no new exception items, there is no re-notification.

In view that Joan Stephens does not take any action, the process management system 100 sends a reminder to her one week after she received an Event Change Notification. An example of the contents of the reminder is as follows:

| Title: Reminder—Employees with missing or invalid data (2562) Message: Your response to event 2562 is outstanding. Please take urgent action. Employees with missing or invalid data | | | | |
| --- | --- | --- | --- | --- |
| 1.0 | Emp1 | 1905-06-06 17:56:42.000 | M | Original Notification: 2006/04/27 4:00 am |
| 5.0 | Emp5 | 1969-02-18 06:33:28.000 | | Original Notification: 2006/04/28 5:00 am |

After another week of no change, the process management system 100 escalates the event to Mary Bean as per the configuration and sends an escalation message is as follows:

| Title: Escalation—Employees with missing or invalid data (2562) Message: Joan Stephens' response to event 2562 is outstanding. Employees with missing or invalid data | | | | |
| --- | --- | --- | --- | --- |
| 1.0 | Emp1 | 1905-06-06 17:56:42.000 | M | Original Notification: 2006/04/27 4:00 am |
| 5.0 | Emp5 | 1969-02-18 06:33:28.000 | | Original Notification: 2006/04/28 5:00 am |

Mary Bean reassigns the event to Justine Landon. Upon the receipt of the reassignment, the process management system 100 sends a transfer of ownership notification to Justine Landon. Joan Stephens is copied on the message. An example of the contents of the notification is as follows:

---

Title: Transfer of Ownership—Employees with missing or invalid data (2562)
Message: Mary Bean has re-assigned event 2562 to you.
Upon a recent load of the data warehouse, Employees with missing or invalid data were detected. Your urgent attention is required to correct this data. Please make amendments within the human resource source system.
Employees with missing or invalid data

| | | | | | |
|---|---|---|---|---|---|
| 1.0 | Emp1 | 1905-06-06 17:56:42.000 | M | Original Notification: | 2006/04/27 4:00 am |
| 5.0 | Emp5 | 1969-02-18 06:33:28.000 | F | Original Notification: | 2006/04/28 5:00 am |

---

Justine Landon makes changes to data in the human resource source system. She fixes both employee's data.

After the warehouse load and data evaluation, the process management system 100 sends confirmation of the fix to Justine Landon, and closes the event. An example of the contents of the confirmation is as follows:

---

Title: Event Closed—Employees with missing or invalid data (2562)
Message: Event 2562 has been revaluated. All exception conditions have now been cleared
Employees with missing or invalid data

| | | | | | | |
|---|---|---|---|---|---|---|
| 1.0 | ✓ | Emp1 | 1975-06-06 17:56:42.000 | M | Original Notification: | 2006/04/27 4:00 am |
| 5.0 | ✓ | Emp5 | 1969-02-18 06:33:28.000 | F | Original Notification: | 2006/04/28 5:00 am |

---

After subsequent warehouse loads, new exceptions may be detected. The next time an exception is detected, a new event is created.

In the above example, the data corrections were applied within the human resource source system. In the following example, the administrator reconfigures the process for Employee exceptions to allow corrections from within the process modeling tool 300 in the process management system 200.

The administrator reconfigures the process to allow the capture of corrections within the process modeling tool 300. A read/write grid is presented in the process modeling tool. The user can make changes to data within the process modeling tool and submit these changes. Changes are not written directly to the human resource source system. The changes are written to a staging table of the data warehouse. The administrator writes a custom process that takes data from the staging table and writes it to the human resource source system. Configuration Settings enabled for writable grid are as follows:

---

| | |
|---|---|
| Data Update Rule: | Allow Updates |
| Update Columns: | Gender; Date of Birth |
| Auto-update Warehouse: | N. |

---

After consultation with the administrator of the human resource source system, the administrator of the process management system 200 chooses to apply data edits to the warehouse automatically rather than uploading them into the human resource source system, and sets the configuration as follows:

Auto-update Warehouse: Y

The administrator of the process management system 200 sets event detection to use Change Data Capture, and updates the metadata as follows:

---

| | |
|---|---|
| CDC Columns: | PERSON.CREATED_DATE; PERSON.CHANGED_DATE |

---

The administrator reconfigures Employee exceptions to divide corrections among several owners as follows:

---

| | |
|---|---|
| Query: | select employee_id, full_name, date_of_birth, gender, CASE<br>    WHEN EMPLOYEE_ID < 300 THEN 'Tim Holden'<br>    WHEN EMPLOYEE_ID between 300 and 600<br>    THEN 'James Crawford'<br>    ELSE 'Justine Landon'<br>END as Owner_ID<br>from PERSON<br>where (date_of_birth is null or gender is null or date_of_birth < '1910-01-01')<br>order by employee_id |
| EventOwner: | $Owner_Id |
| Event Key Columns: | Owner_Id |

---

According to the business rules of the organization, all managers should carry out a performance review for each employee every year. Managers are sent a reminder after 11 months have elapsed since the last performance review for each employee. After a year has passed, if there is still no record of performance review, a second message is sent to the manager. One month after the second reminder, an escalation is sent out to the manager's manager. Based on these business rules, the administrator configures Performance Review Due as follows:

---

| | |
|---|---|
| Event Type Name: | Performance Review Due |
| Query: | select e.EMPLOYEE_ID, e.Manager_ID, e.ManagerManager_ID,review.PERFORMANCE_REVIEW_SID, review.REVIEW_DATE as LAST_REVIEW, review.NEXT_REVIEW_PLAN, review.NEXT_ACTUAL_REVIEW<br>from<br>  PERSON e<br>left outer join<br>((select last.EMPLOYEE_ID,last.PERFORMANCE_REVIEW_SID, last.REVIEW_DATE, last.NEXT_REVIEW_PLAN, |

```
                            min(next.REVIEW_DATE) as NEXT_ACTUAL_REVIEW
                                from
                                (select r.EMPLOYEE_ID, r.PERFORMANCE_REVIEW_SID,
                            r.REVIEW_DATE,    dateadd(year,1,r.REVIEW_DATE)    as
                            NEXT_REVIEW_PLAN
                                from PERFORMANCE_REVIEW_MEASURES r
                                where r.REVIEW_DATE < getdate( )) last -- filter out future reviews from
                            test data
                                left outer join
                                (select r.EMPLOYEE_ID, r.REVIEW_DATE
                                from PERFORMANCE_REVIEW_MEASURES r
                                where r.REVIEW_DATE < getdate( )) next -- filter out future reviews
                            from test data
                                on last.EMPLOYEE_ID = next.EMPLOYEE_ID
                                and next.REVIEW_DATE > last.REVIEW_DATE
                                group    by    last.EMPLOYEE_ID,last.PERFORMANCE_REVIEW_SID,
                            last.REVIEW_DATE, last.NEXT_REVIEW_PLAN)) review
                            on e.EMPLOYEE_ID = review.EMPLOYEE_ID
                            -- should be condition to only show active employees
                            -- exception conditions
                            -- any planned review that has not been completed
                            where review.NEXT_ACTUAL_REVIEW is null
                            order by 1,3
Display Columns:            Employee Id, Last Review Date, Next Review Planned Date
EventOwner:                 $Manager_Id
Event Due Date:             $Next Review Planned Date
Event Key Columns:          Employee_ID, Performance Review_SID
Reminder Days:              -30, 30
Escalate Days:              60
Escalate To:                $ManagerManager_Id
Non Replication Rule:       Don't replicate events ever
Notify Owner on Auto-close: N
Schedule Type:              Run after execution of dataflow "Performance Review".
Suppress Notification:      Y
Auto-close No Activity:     0 (Do not aut0-close events).
Owner Notification:         Open; Approval Rejection; Approval; Transfer of ownership;
```

The process management system 200 creates a new event each time a performance review is performed. No notification is sent. The due date for resolution of the event is set as the previous completed review plus one year. Reminders and escalations are based on due date. When a performance review is completed the "future performance review" event is closed. No notification may not be required on close. The above query may be modified to take into account new employees whose first review is scheduled for one year after hiring, and/or filter on only active employees.

The administrator adds a URL link to a report showing the performance review history of the employee, as follows:

```
Links:   HR Manager.Employee Reports.Employee Performance
         Review History Employee Id = $EmployeeId
```

The administrator configures an Employee List Confirmation process based on the business rules that each manager is sent a list of employees. The process management system 200 sends a notification to ask Managers to confirm that the employees on the list still report to them.

The administrator may also configure a Payroll Data Verification Audit process such that a payroll manager verifies payroll information after each warehouse load. The process management system 200 allows the payroll manager to confirm that he has done this. These confirmations are recorded for audit purposes.

Figure 10:
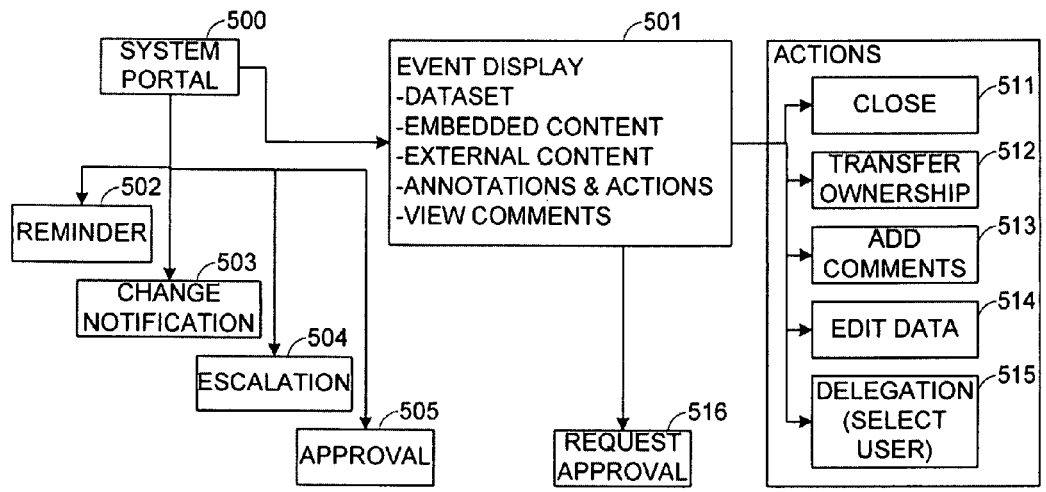
FIG. 10 is a diagram showing an example of a screen map for consumer user interface.
Figure 13:
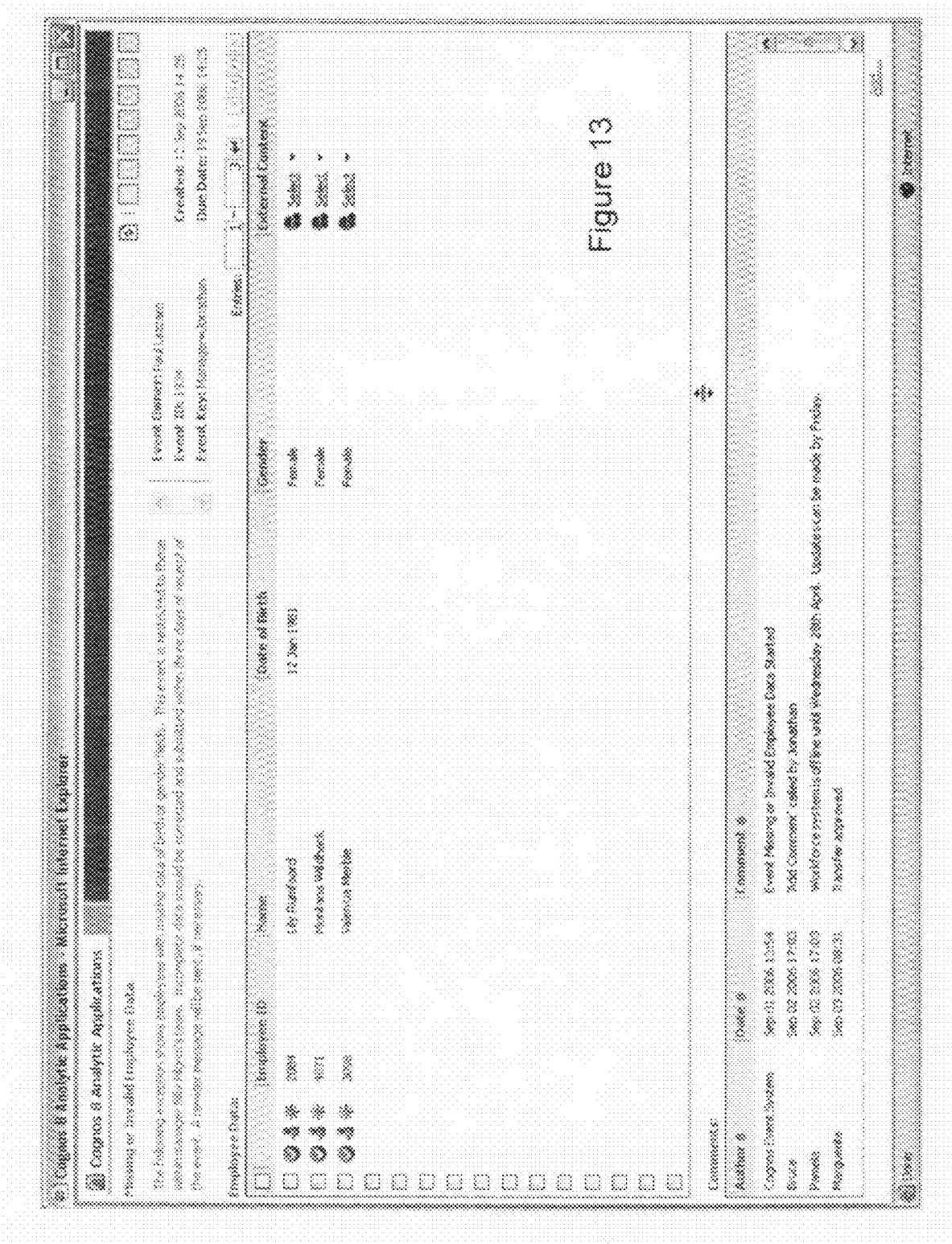
FIG. 13 is a screen shot showing an example of a process user interface screen.
Figure 14:
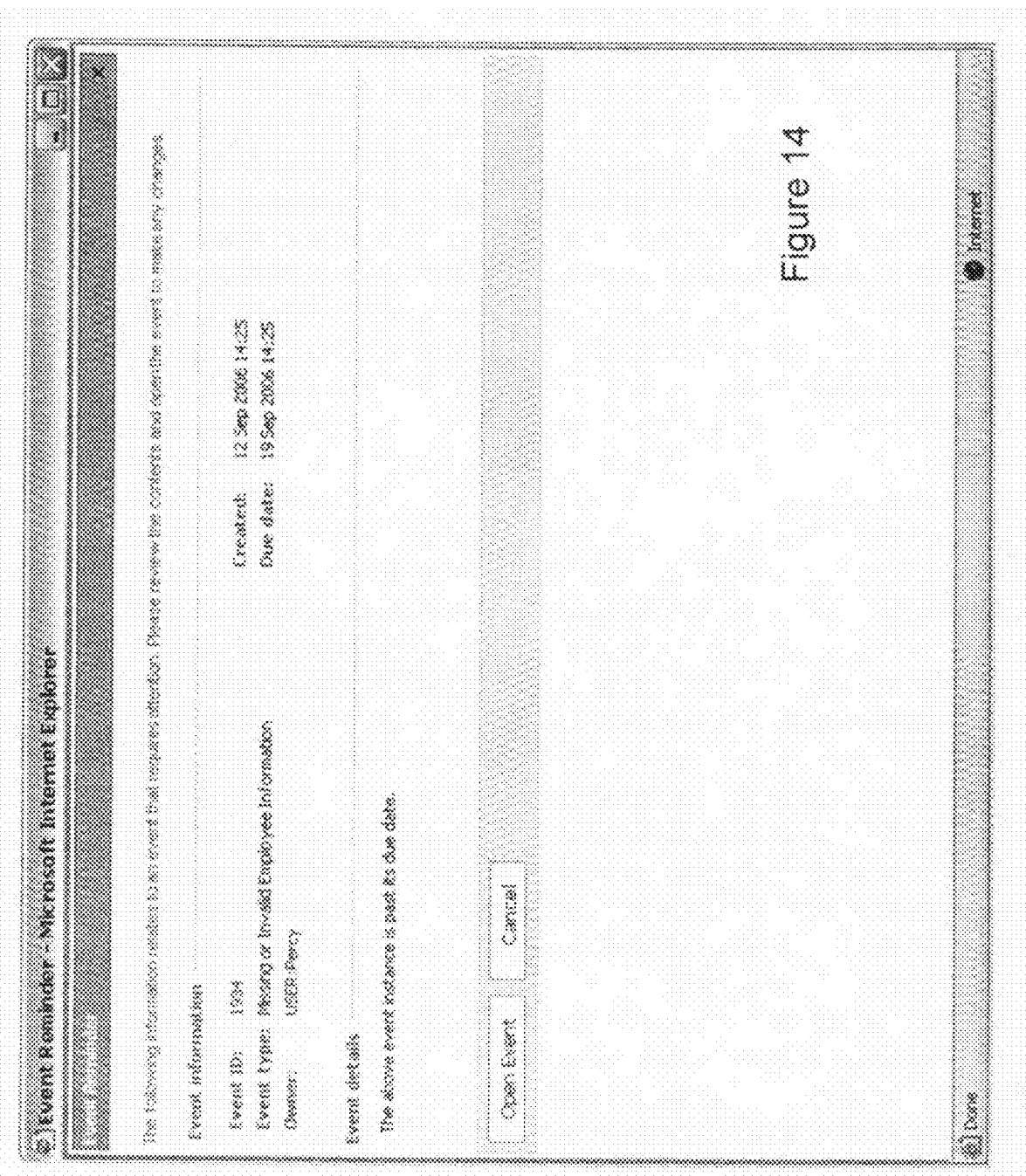
FIG. 14 is a screen shot showing another example of the process user interface screen.
Figure 15:
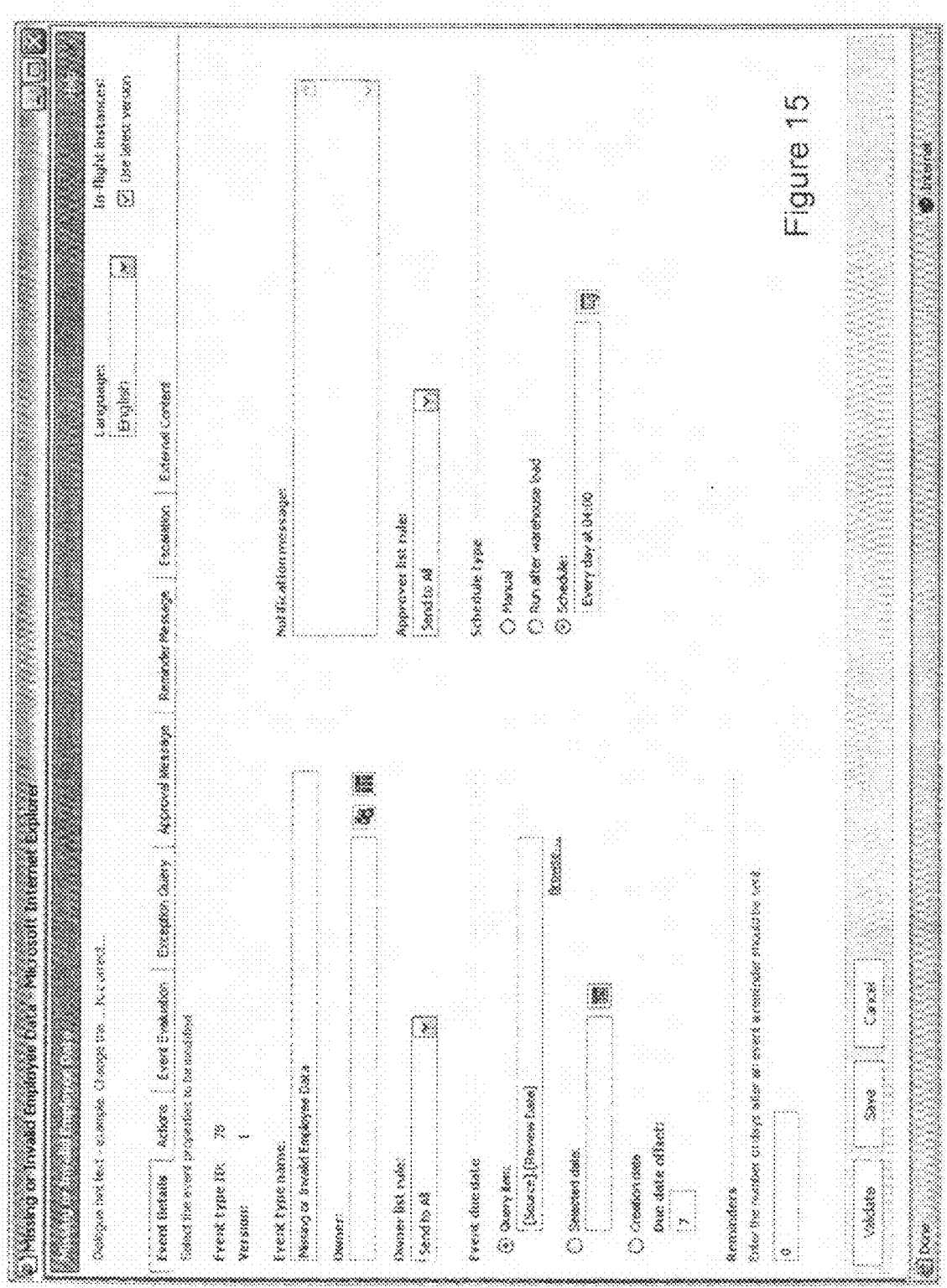
FIG. 15 is a screen shot showing another example of the process user interface screen.
Figure 16:
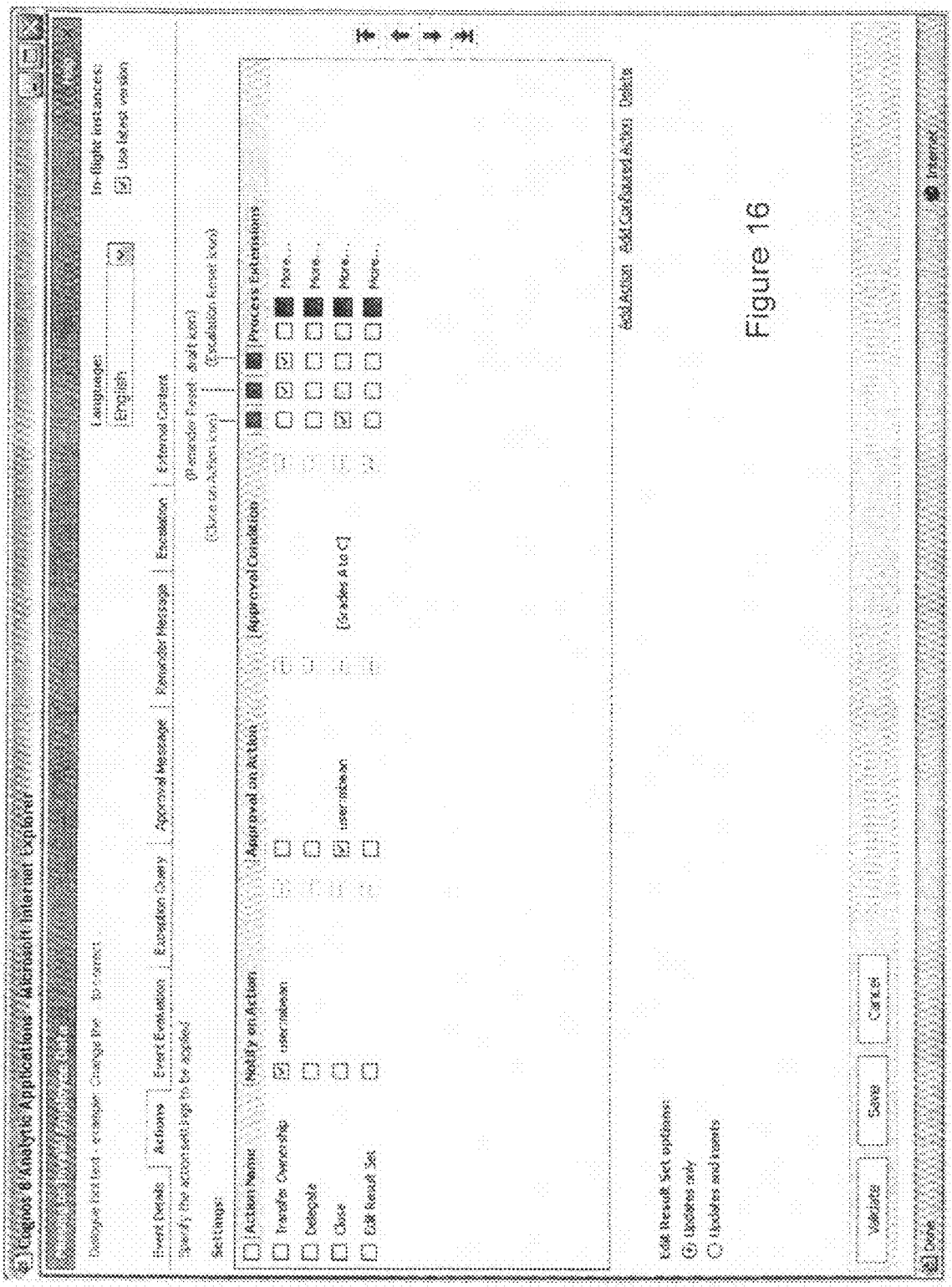
FIG. 16 is a screen shot showing another example of the process user interface screen.
Figure 17:
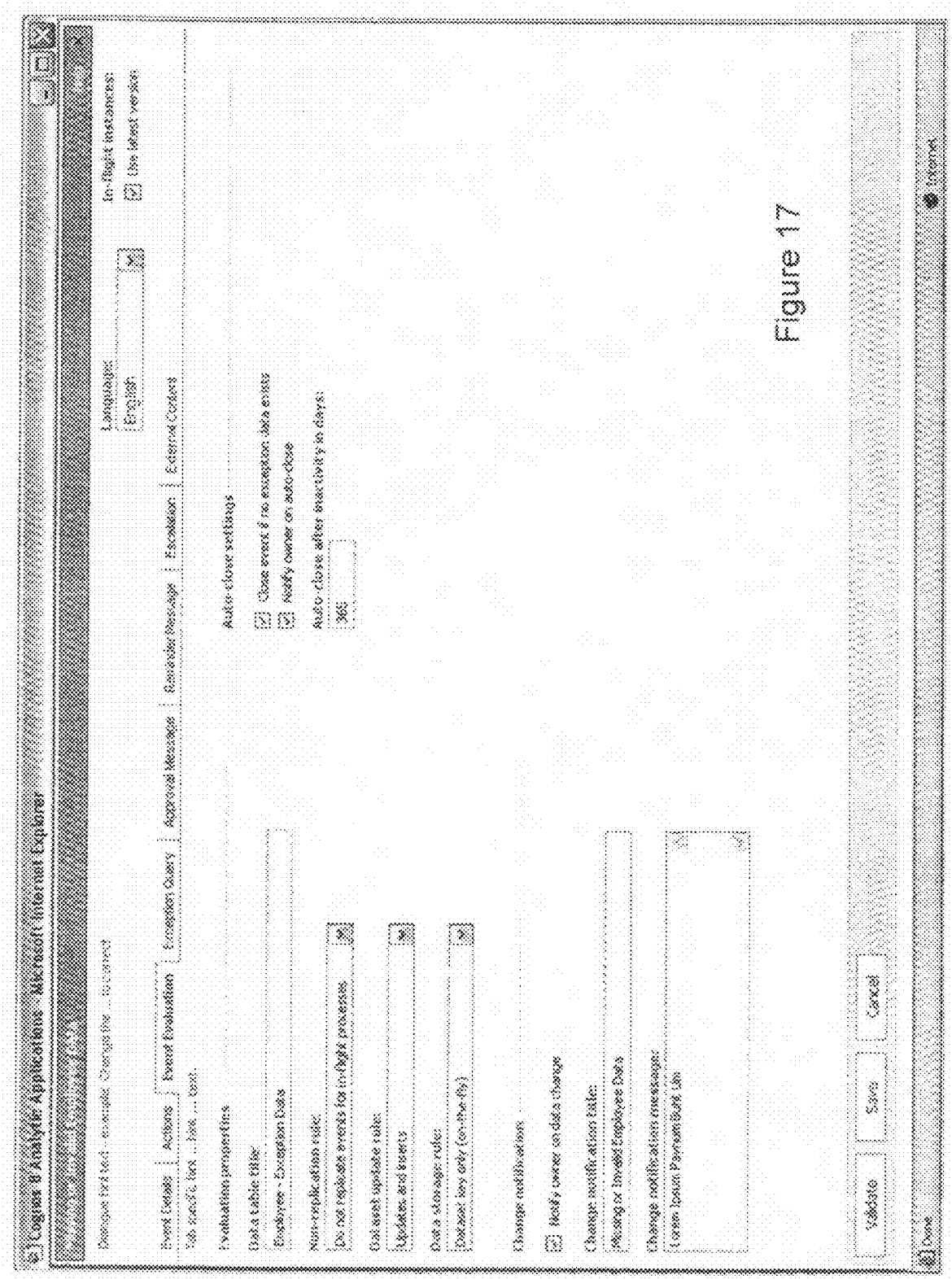
FIG. 17 is a screen shot showing another example of the process user interface screen.
Figure 19:
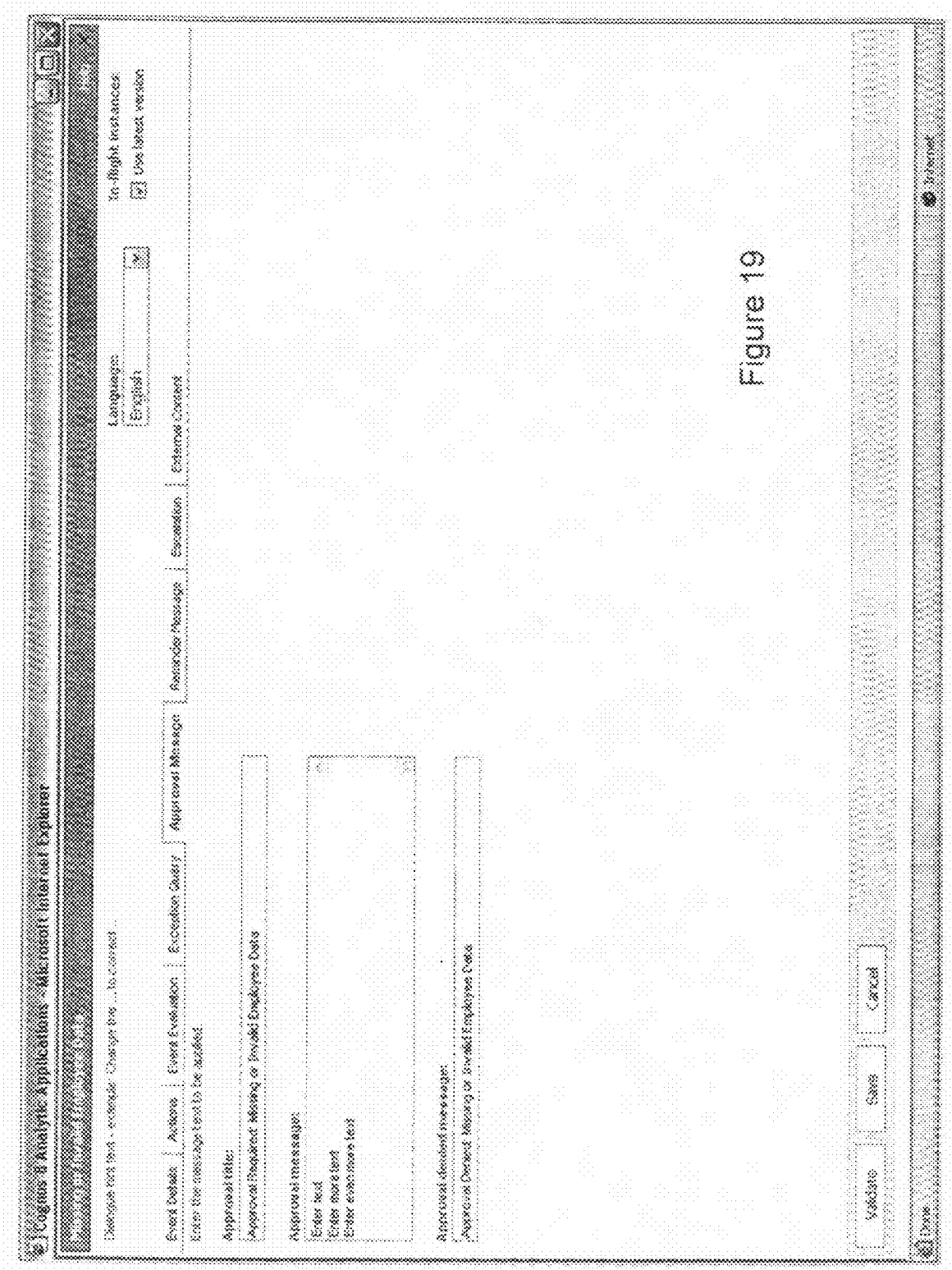
FIG. 19 is a screen shot showing another example of the process user interface screen.
Figure 20:
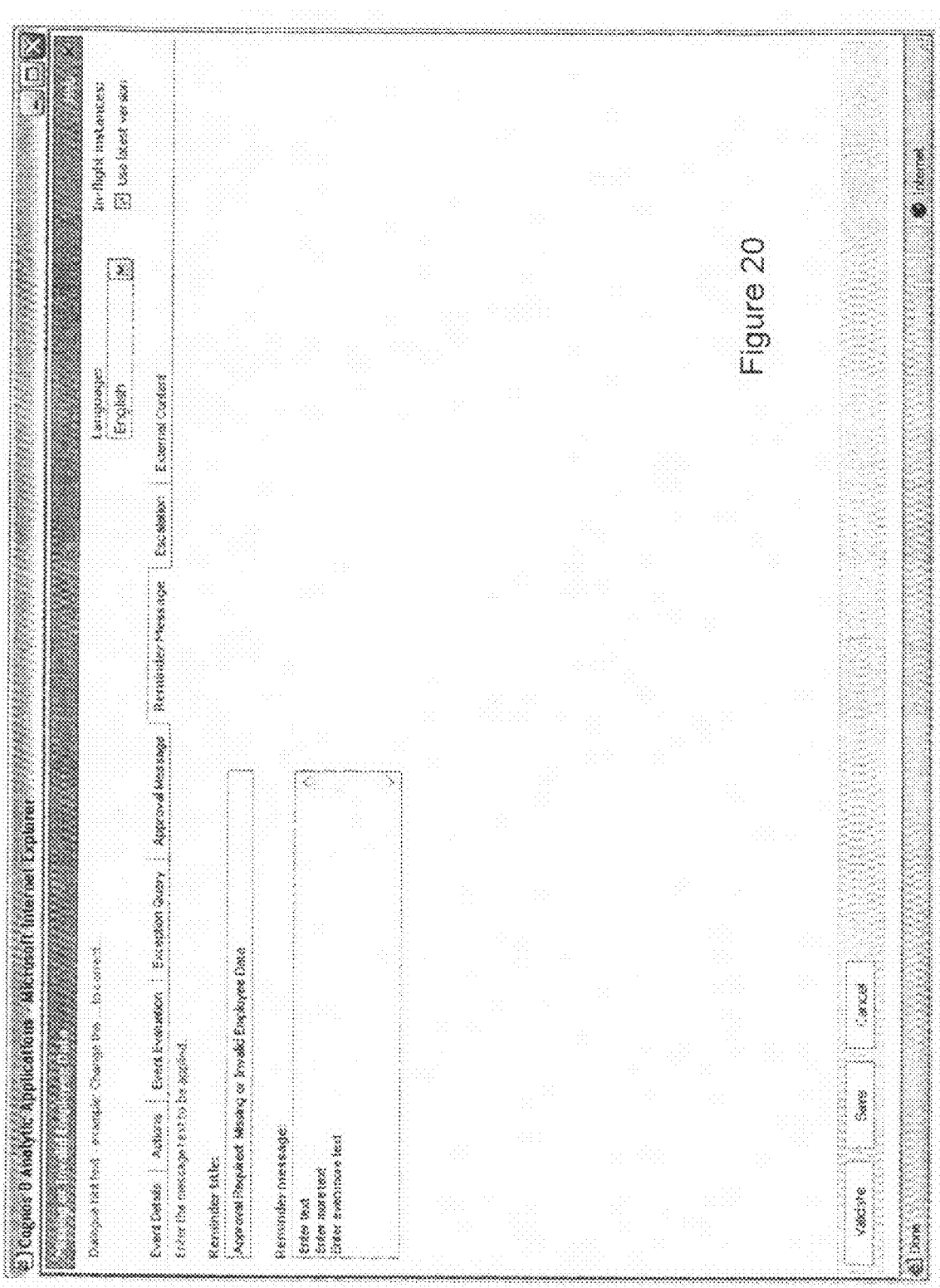
FIG. 20 is a screen shot showing another example of the process user interface screen.
Figure 21:
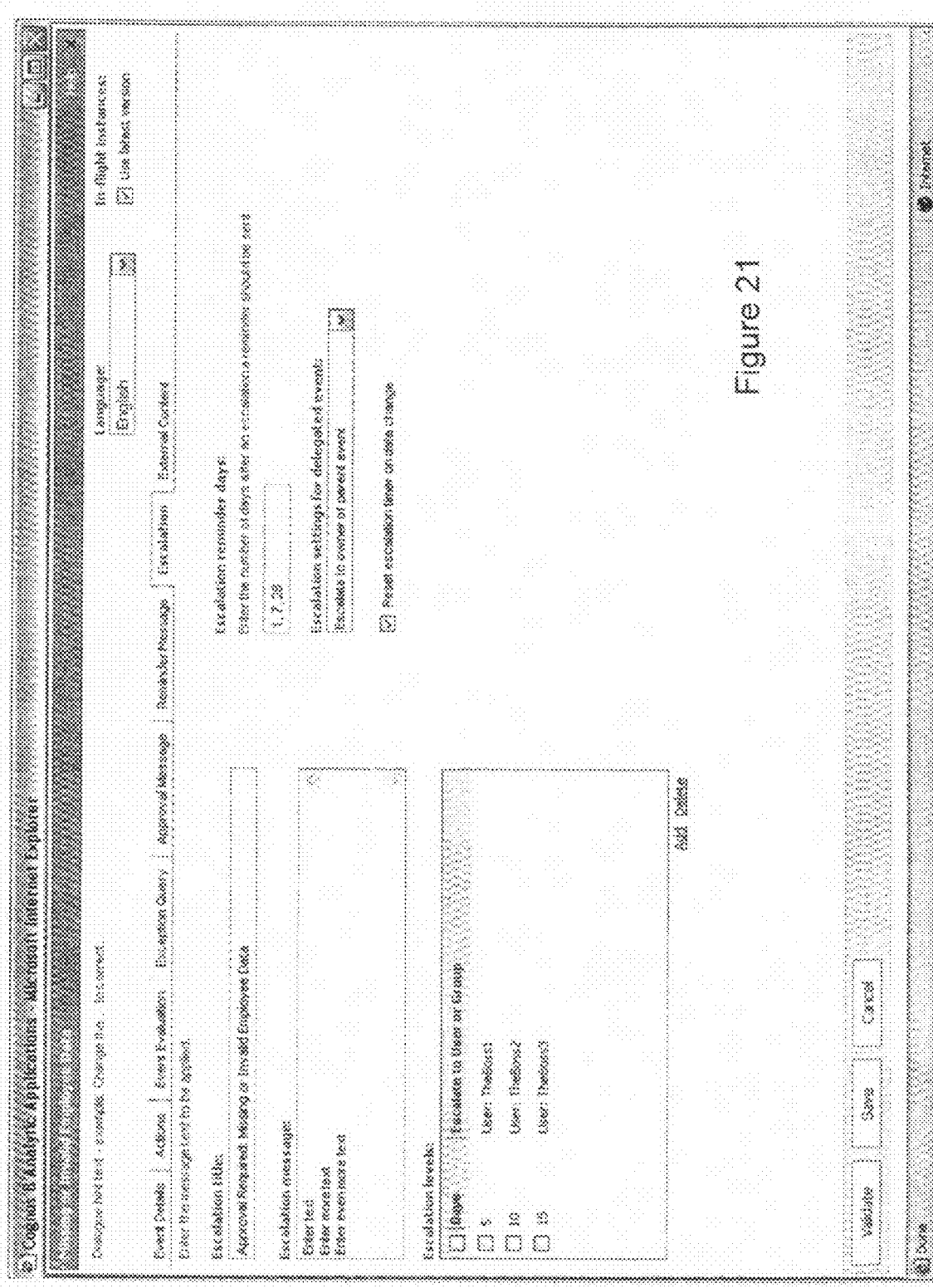
FIG. 21 is a screen shot showing another example of the process user interface screen.
Figure 22:
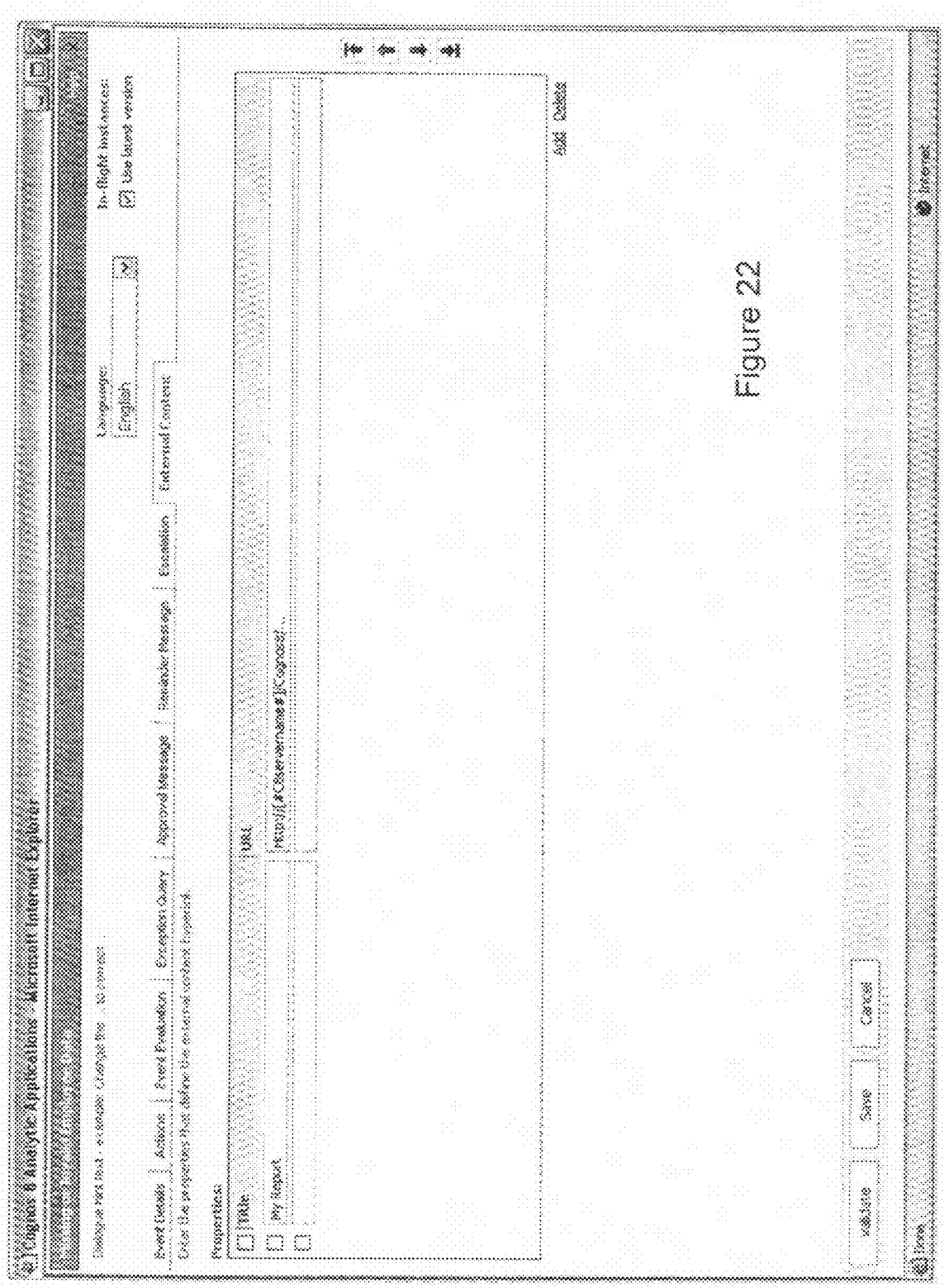
FIG. 22 is a screen shot showing another example of the process user interface screen.

FIG. 10 shows an example of a screen map for process user interfaces for consumers of the process management system 100, 200. From the system portal 500, a user or consumer may select a screen of event display 501, reminder 502, change notification 503, escalation 504 or approval 505. The event display screen 501 shows items and options for data set, embedded content, external content, annotations and actions, and view comments. From the event display screen 501, the user can select an actions screen, close 511, transfer ownership 112, add comments 513, edit data 514 or delegation (select user) 515, or a request approval screen 516. An example event display screen 501 is shown in FIG. 13. An example reminder screen 502 is shown in FIG. 14.

Figure 11:
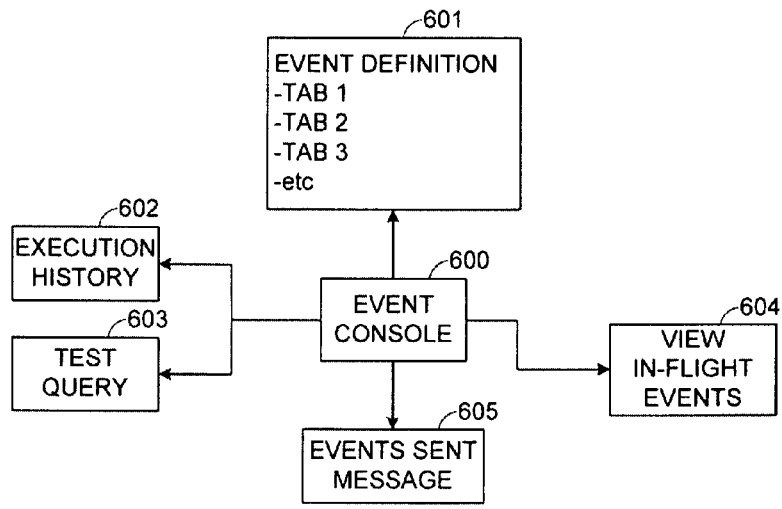
FIG. 11 is a diagram showing an example of a screen map for administrator user interface.

FIG. 11 shows an example of a screen map for user interfaces for administrator of the process management system 100, 200. From an event console screen 600, the administrator of the system may select to view a screen of event definition 601, execution history 602, test query 603, view in-flight events, or events sent message 605. The event definition screen 601 is used for defining processes, i.e., configuring process metadata.

Figure 12:
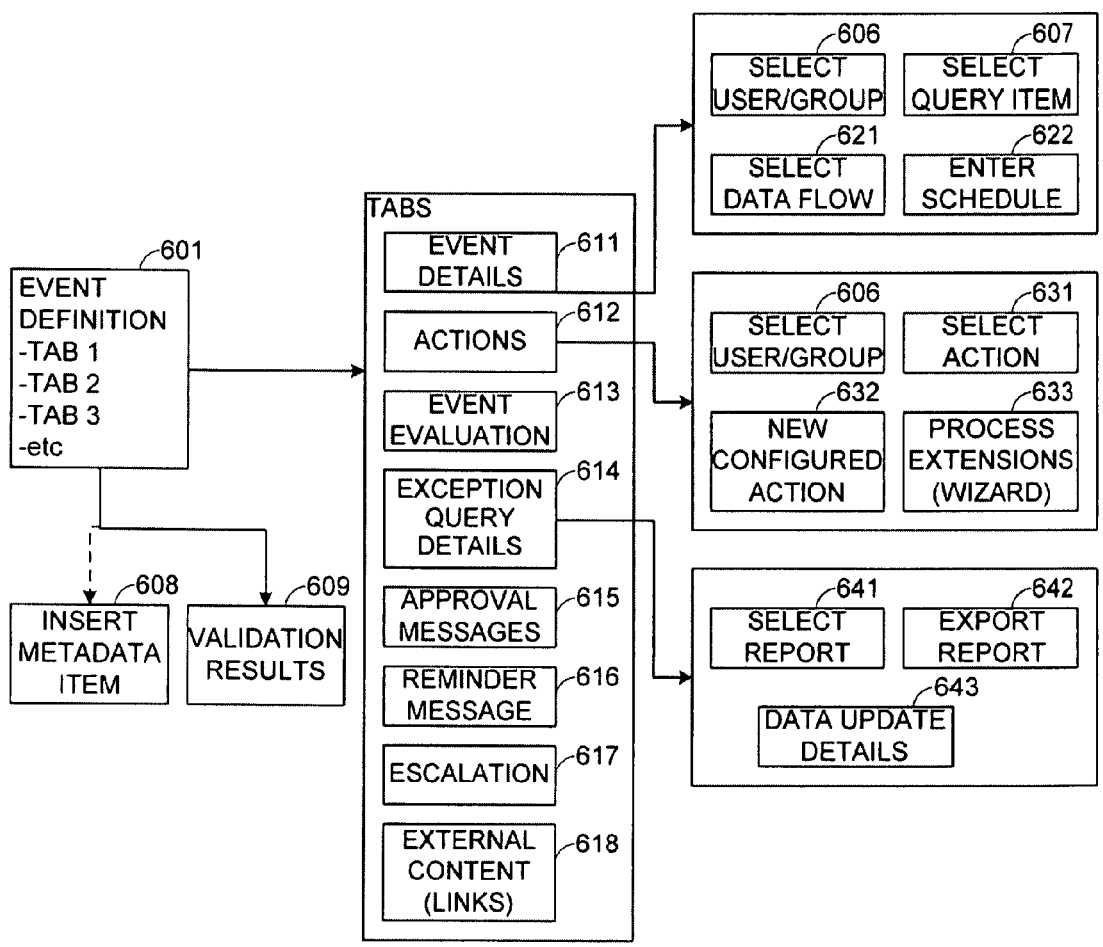
FIG. 12 is a diagram showing an example of a screen map for event definition administrator user interface.

FIG. 12 shows an example of a screen map for the vent definition 601 shown in FIG. 11. The event definition screen 601 provides various options of screens including event details 611, actions 612, event evaluation 613, exception query details 614, approval messages 615, reminder message 616, escalation 617, and external content (links) 618. From the event details screen 611, the administrator can select a screen of select user/group 606, select query item 607, select data flow 621, or enter schedule 622. From the actions screen 612, the administrator can select a screen of select user/group 606, select action 631, new configured action 632, or process extensions 633. From the exception query details screen 214, the administrator can select a screen of select report 641, export to report 642, or data update details 643. Example event details screen 611, actions screen 612, event evaluation screen 613, exception query details screen 614, approval messages screen 615, reminder message screen 616, escalation screen 617, and external content (links) screen 618 are shown in FIGS. 15 to 22.

From the event definition screen 601, the administrator may also select a screen of an insert metadata item 608, or validation results 609.

The process management system of the present invention may be implemented by any hardware, software or a combination of hardware and software having the above described functions. The software code, instructions and/or statements, either in its entirety or a part thereof, may be stored in a computer readable memory. Further, a computer data signal representing the software code, instructions and/or statements may be embedded in a carrier wave may be transmitted via a communication network. Such a computer readable memory and a computer data signal and/or its carrier are also within the scope of the present invention, as well as the hardware, software and the combination thereof.

While particular embodiments of the present invention have been shown and described, changes and modifications may be made to such embodiments without departing from the scope of the invention. For example, the elements of the process management system are described separately, however, two or more elements may be provided as a single element, or one or more elements may be shared with other components in one or more computer systems.

What is claimed is:

1. A process management system comprising:
    a process model for storing predefined process metadata components of one or more business management processes, the process metadata components having configurability;
    a process engine for configuring the process metadata components, and for generating user interface contents for a specific management process based on a set of the process metadata components relevant to the specific management process; and
    a process user interface for presenting the user interface contents for configuration of the process metadata components, and for conducting the specific management process using the generated user interface contents.

2. The process management system as claimed in claim 1, wherein the process model includes the process metadata components in declarative specification.

3. The process management system as claimed in claim 2, wherein the process metadata components are extensible mark up files.

4. The process management system as claimed in claim 1, wherein the process model includes the process metadata components describing an event management process for an event involving one or more exceptions.

5. The process management system as claimed in claim 1, wherein the process engine includes a process modeling unit comprising:
    a process metadata interpreter for reading and interpreting the process metadata components stored in the process model;
    a process metadata configuration unit for configuring the process metadata components; and
    a process user interface contents generator for generating user interface contents based on the process metadata contents.

6. The process management system as claimed in claim 1, wherein the process engine includes a process managing unit comprising:
    an event handler for detecting an event and reading a set of the process metadata components that processes the event from the process model to manage the event based on the set of the process metadata components.

7. The process management system as claimed in claim 6, wherein the process managing unit further comprising at least one of a notification handler for sending notifications, a user action handler for handling user actions, an approval handler for handling an approval process, and a reminder handler for handling reminders.

8. A method of automating a management process, the method comprising the steps of:
    providing a process model storing predefined process metadata components of one or more business management processes;
    configuring a set of the process metadata components for processing a specific management process;
    detecting the specific management process;
    reading the set of the process metadata components;
    generating user interface contents for the specific management process based on the set of the process metadata components; and
    presenting the user interface contents for a user action for conducting the specific management process.

9. The method as claimed in claim 8, wherein the process model providing step provides the process metadata components in declarative specification.

10. The method as claimed in claim 9, wherein the process metadata providing step provides the process metadata components as extensible mark up files.

11. The method as claimed in claim 8, wherein the process model providing step provides the process metadata components describing an event management process for processing an event involving one or more exceptions.

12. The method as claimed in claim 11, wherein
    the detecting step detects the event;
    the reading step reads the set of the process metadata components relevant to processing the event;
    the generating step generates an event detect notification based on the set of the process metadata components; and
    the presenting step sends the event detect notification to an owner of the event based on the set of the process metadata components.

13. The method as claimed in claim 12, further comprising the steps of:
    processing a user action, processing an approval, sending one or more reminders, and/or escalating the event based on the set of the process metadata components.

14. A computer readable medium storing instructions or statements for use in the execution in a computer of a method of automating a management process, the method comprising the steps of:
    providing a process model storing predefined process metadata components of one or more business management processes;
    configuring a set of the process metadata components for processing a specific management process;
    detecting the specific management process;
    reading the set of the process metadata components;
    generating user interface contents for the specific management process based on the set of the process metadata components; and
    presenting the user interface contents for a user action for conducting the specific management process.

* * * * *